(12) United States Patent
Schulz et al.

(10) Patent No.: US 8,250,341 B2
(45) Date of Patent: Aug. 21, 2012

(54) PIPELINE ACCELERATOR HAVING MULTIPLE PIPELINE UNITS AND RELATED COMPUTING MACHINE AND METHOD

(75) Inventors: Kenneth R Schulz, Manassas, VA (US); John W Rapp, Manassas, VA (US); Larry Jackson, Manassas, VA (US); Mark Jones, Centreville, VA (US); Troy Cherasaro, Culpeper, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 80 days.

(21) Appl. No.: 12/151,116

(22) Filed: May 2, 2008

(65) Prior Publication Data

US 2008/0222337 A1    Sep. 11, 2008

Related U.S. Application Data

(63) Continuation of application No. 10/683,932, filed on Oct. 9, 2003, now Pat. No. 7,386,704.

(60) Provisional application No. 60/422,503, filed on Oct. 31, 2002.

(51) Int. Cl.
  *G06F 15/00* (2006.01)
(52) U.S. Cl. ............. 712/34; 713/600; 710/305; 712/37
(58) Field of Classification Search .................. 713/600; 712/34, 37, 15; 710/305
See application file for complete search history.

(56) References Cited

U.S. PATENT DOCUMENTS

| | | | |
|---|---|---|---|
| 3,665,173 A | 5/1972 | Bouricius et al. | |
| 4,703,475 A | 10/1987 | Dretzka et al. | |
| 4,774,574 A | 9/1988 | Daly et al. | |
| 4,782,461 A * | 11/1988 | Mick et al. | ...................... 703/28 |
| 4,862,407 A | 8/1989 | Fette et al. | |
| 4,873,626 A | 10/1989 | Gifford | |
| 4,914,653 A | 4/1990 | Bishop et al. | |
| 4,956,771 A | 9/1990 | Neustaedter | |
| 4,985,832 A | 1/1991 | Grondalski | |

(Continued)

FOREIGN PATENT DOCUMENTS

AU    2003287317    6/2004

(Continued)

OTHER PUBLICATIONS

Lecurieux-Lafayette G: "Un Seul FPGA Dope Le Traitement D'Images", Electronique, CEP Communication, Paris, FR, No. 55, 1996, pp. 98, 101-103.

(Continued)

*Primary Examiner* — Idriss N Alrobaye
(74) *Attorney, Agent, or Firm* — Graybeal Jackson LLP

(57) ABSTRACT

A pipeline accelerator includes a bus and a plurality of pipeline units, each unit coupled to the bus and including at least one respective hardwired-pipeline circuit. By including a plurality of pipeline units in the pipeline accelerator, one can increase the accelerator's data-processing performance as compared to a single-pipeline-unit accelerator. Furthermore, by designing the pipeline units so that they communicate via a common bus, one can alter the number of pipeline units, and thus alter the configuration and functionality of the accelerator, by merely coupling or uncoupling pipeline units to or from the bus. This eliminates the need to design or redesign the pipeline-unit interfaces each time one alters one of the pipeline units or alters the number of pipeline units within the accelerator.

14 Claims, 8 Drawing Sheets

U.S. PATENT DOCUMENTS

| | | | |
|---|---|---|---|
| 5,185,871 A | 2/1993 | Frey et al. | |
| 5,283,883 A | 2/1994 | Mishler | |
| 5,317,752 A | 5/1994 | Jewett et al. | |
| 5,339,413 A | 8/1994 | Koval et al. | |
| 5,361,373 A | 11/1994 | Gilson | |
| 5,371,896 A * | 12/1994 | Gove et al. | 712/20 |
| 5,377,333 A | 12/1994 | Nakagoshi et al. | |
| 5,421,028 A * | 5/1995 | Swanson | 712/42 |
| 5,428,754 A | 6/1995 | Baldwin | |
| 5,440,682 A * | 8/1995 | Deering | 345/503 |
| 5,524,075 A * | 6/1996 | Rousseau et al. | 382/302 |
| 5,544,067 A | 8/1996 | Rostoker et al. | |
| 5,583,964 A | 12/1996 | Wang | |
| 5,623,418 A | 4/1997 | Rostoker et al. | |
| 5,640,107 A | 6/1997 | Kruse | |
| 5,648,732 A * | 7/1997 | Duncan | 326/40 |
| 5,649,135 A | 7/1997 | Pechanek et al. | |
| 5,655,069 A | 8/1997 | Ogawara et al. | |
| 5,694,371 A * | 12/1997 | Kawaguchi | 365/233.11 |
| 5,710,910 A * | 1/1998 | Kehl et al. | 713/400 |
| 5,712,922 A | 1/1998 | Loewenthal et al. | |
| 5,732,107 A | 3/1998 | Phillips et al. | |
| 5,752,071 A | 5/1998 | Tubbs et al. | |
| 5,784,636 A | 7/1998 | Rupp et al. | |
| 5,801,958 A | 9/1998 | Dangelo et al. | |
| 5,867,399 A | 2/1999 | Rostoker et al. | |
| 5,892,962 A | 4/1999 | Cloutier | |
| 5,909,565 A | 6/1999 | Morikawa et al. | |
| 5,910,897 A | 6/1999 | Dangelo et al. | |
| 5,916,307 A | 6/1999 | Piskiel et al. | |
| 5,930,147 A | 7/1999 | Takei | |
| 5,931,959 A | 8/1999 | Kwiat | |
| 5,933,356 A | 8/1999 | Rostoker et al. | |
| 5,941,999 A | 8/1999 | Matena et al. | |
| 5,963,454 A | 10/1999 | Dockser et al. | |
| 5,987,620 A * | 11/1999 | Tran | 713/600 |
| 5,996,059 A * | 11/1999 | Porten et al. | 712/200 |
| 6,009,531 A * | 12/1999 | Selvidge et al. | 713/400 |
| 6,018,793 A | 1/2000 | Rao | |
| 6,023,742 A | 2/2000 | Ebeling et al. | |
| 6,028,939 A | 2/2000 | Yin | |
| 6,049,222 A | 4/2000 | Lawman et al. | |
| 6,096,091 A | 8/2000 | Hartmann | |
| 6,108,693 A | 8/2000 | Tamura | |
| 6,112,288 A * | 8/2000 | Ullner | 712/20 |
| 6,115,047 A * | 9/2000 | Deering | 345/422 |
| 6,128,755 A | 10/2000 | Bello et al. | |
| 6,192,384 B1 | 2/2001 | Dally et al. | |
| 6,202,139 B1 * | 3/2001 | Witt et al. | 711/169 |
| 6,205,516 B1 | 3/2001 | Usami | |
| 6,216,191 B1 | 4/2001 | Britton et al. | |
| 6,216,252 B1 | 4/2001 | Dangelo et al. | |
| 6,237,054 B1 | 5/2001 | Freitag, Jr. | |
| 6,247,118 B1 | 6/2001 | Zumkehr et al. | |
| 6,247,134 B1 * | 6/2001 | Sproch et al. | 713/320 |
| 6,253,276 B1 | 6/2001 | Jeddeloh | |
| 6,282,578 B1 | 8/2001 | Aizono et al. | |
| 6,282,627 B1 | 8/2001 | Wong et al. | |
| 6,308,311 B1 | 10/2001 | Carmichael et al. | |
| 6,324,678 B1 | 11/2001 | Dangelo et al. | |
| 6,326,806 B1 | 12/2001 | Fallside et al. | |
| 6,363,465 B1 * | 3/2002 | Toda | 711/169 |
| 6,405,266 B1 | 6/2002 | Bass et al. | |
| 6,470,482 B1 | 10/2002 | Rostoker et al. | |
| 6,477,170 B1 * | 11/2002 | Lu et al. | 370/402 |
| 6,516,420 B1 * | 2/2003 | Audityan et al. | 713/400 |
| 6,526,430 B1 | 2/2003 | Hung et al. | |
| 6,532,009 B1 | 3/2003 | Fox et al. | |
| 6,606,360 B1 * | 8/2003 | Dunning et al. | 375/354 |
| 6,611,920 B1 * | 8/2003 | Fletcher et al. | 713/322 |
| 6,624,819 B1 | 9/2003 | Lewis | |
| 6,625,749 B1 | 9/2003 | Quach | |
| 6,662,285 B1 | 12/2003 | Douglass et al. | |
| 6,684,314 B1 | 1/2004 | Manter | |
| 6,704,816 B1 | 3/2004 | Burke | |
| 6,708,239 B1 | 3/2004 | Ellerbrock et al. | |
| 6,769,072 B1 | 7/2004 | Kawamura et al. | |
| 6,785,841 B2 | 8/2004 | Akrout et al. | |
| 6,785,842 B2 | 8/2004 | Zumkehr et al. | |
| 6,829,697 B1 | 12/2004 | Davis et al. | |
| 6,839,873 B1 | 1/2005 | Moore | |
| 6,915,502 B2 | 7/2005 | Schott et al. | |
| 6,925,549 B2 * | 8/2005 | Cook et al. | 712/25 |
| 6,982,976 B2 | 1/2006 | Galicki et al. | |
| 6,985,975 B1 | 1/2006 | Chamdani et al. | |
| 7,000,213 B2 | 2/2006 | Banerjee et al. | |
| 7,024,654 B2 | 4/2006 | Bersch et al. | |
| 7,036,059 B1 | 4/2006 | Carmichael et al. | |
| 7,073,158 B2 | 7/2006 | McCubbrey | |
| 7,117,390 B1 | 10/2006 | Klarer et al. | |
| 7,134,047 B2 | 11/2006 | Quach | |
| 7,137,020 B2 | 11/2006 | Gilstrap et al. | |
| 7,143,302 B2 * | 11/2006 | Pappalardo et al. | 713/500 |
| 7,143,418 B1 | 11/2006 | Patterson | |
| 7,177,310 B2 | 2/2007 | Inagaki et al. | |
| 7,200,114 B1 | 4/2007 | Tse-Au | |
| 7,228,520 B1 | 6/2007 | Keller et al. | |
| 7,260,794 B2 | 8/2007 | Butts | |
| 7,284,225 B1 | 10/2007 | Ballagh et al. | |
| 7,373,432 B2 | 5/2008 | Rapp et al. | |
| 7,386,704 B2 | 6/2008 | Schulz et al. | |
| 7,404,170 B2 | 7/2008 | Schott et al. | |
| 7,418,574 B2 | 8/2008 | Mathur et al. | |
| 7,487,302 B2 | 2/2009 | Gouldey et al. | |
| 2001/0014937 A1 | 8/2001 | Huppenthal et al. | |
| 2001/0025338 A1 | 9/2001 | Zumkehr et al. | |
| 2001/0047509 A1 | 11/2001 | Mason et al. | |
| 2002/0018470 A1 | 2/2002 | Galicki et al. | |
| 2002/0041685 A1 | 4/2002 | McLoone et al. | |
| 2002/0066910 A1 * | 6/2002 | Tamemoto et al. | 257/200 |
| 2002/0087829 A1 | 7/2002 | Snyder et al. | |
| 2002/0112091 A1 | 8/2002 | Schott et al. | |
| 2002/0120883 A1 * | 8/2002 | Cook et al. | 713/600 |
| 2002/0144175 A1 * | 10/2002 | Long et al. | 714/11 |
| 2002/0162086 A1 | 10/2002 | Morgan | |
| 2003/0009651 A1 | 1/2003 | Najam et al. | |
| 2003/0014627 A1 | 1/2003 | Krishna et al. | |
| 2003/0061409 A1 | 3/2003 | RuDusky | |
| 2003/0115500 A1 | 6/2003 | Akrout et al. | |
| 2003/0177223 A1 | 9/2003 | Erickson et al. | |
| 2003/0229877 A1 | 12/2003 | Bersch et al. | |
| 2003/0231649 A1 | 12/2003 | Awoseyi et al. | |
| 2004/0019771 A1 | 1/2004 | Quach | |
| 2004/0019883 A1 | 1/2004 | Banerjee et al. | |
| 2004/0044915 A1 * | 3/2004 | Bose et al. | 713/320 |
| 2004/0045015 A1 | 3/2004 | Haji-Aghajani et al. | |
| 2004/0061147 A1 | 4/2004 | Fujita et al. | |
| 2004/0064198 A1 | 4/2004 | Reynolds et al. | |
| 2004/0123258 A1 | 6/2004 | Butts | |
| 2004/0133763 A1 | 7/2004 | Mathur et al. | |
| 2004/0136241 A1 | 7/2004 | Rapp et al. | |
| 2004/0153752 A1 | 8/2004 | Sutardja et al. | |
| 2004/0170070 A1 | 9/2004 | Rapp et al. | |
| 2004/0181621 A1 | 9/2004 | Mathur et al. | |
| 2005/0104743 A1 | 5/2005 | Ripolone et al. | |
| 2005/0149898 A1 | 7/2005 | Hakewill et al. | |
| 2006/0036774 A1 | 2/2006 | Schott et al. | |
| 2006/0085781 A1 | 4/2006 | Rapp et al. | |
| 2006/0087450 A1 | 4/2006 | Schulz et al. | |
| 2006/0101250 A1 | 5/2006 | Rapp et al. | |
| 2006/0101253 A1 | 5/2006 | Rapp et al. | |
| 2006/0101307 A1 | 5/2006 | Rapp et al. | |
| 2006/0123282 A1 | 6/2006 | Gouldey et al. | |
| 2006/0149920 A1 | 7/2006 | Rapp et al. | |
| 2006/0152087 A1 | 7/2006 | De Oliverira Kastrup Pereira et al. | |
| 2006/0206850 A1 | 9/2006 | McCubbrey | |
| 2006/0230377 A1 | 10/2006 | Rapp et al. | |
| 2006/0236018 A1 | 10/2006 | Dao et al. | |
| 2007/0055907 A1 | 3/2007 | Sutardja et al. | |
| 2007/0271545 A1 | 11/2007 | Eng | |
| 2008/0222337 A1 | 9/2008 | Schulz et al. | |

FOREIGN PATENT DOCUMENTS

| | | |
|---|---|---|
| AU | 2003287318 | 6/2004 |
| AU | 2003287319 | 6/2004 |
| AU | 2003287320 | 6/2004 |

| | | |
|---|---|---|
| AU | 2003287321 | 6/2004 |
| CA | 2503611 | 5/2004 |
| CA | 2503613 | 5/2004 |
| CA | 2503617 | 5/2004 |
| CA | 2503620 | 5/2004 |
| CA | 2503622 | 5/2004 |
| EP | 0 694 847 A2 | 1/1996 |
| EP | 0 945 788 A2 | 9/1999 |
| EP | 1 061 438 A1 | 12/2000 |
| EP | 1 061 439 A1 | 12/2000 |
| EP | 0 945 788 A3 | 6/2002 |
| EP | 1559005 | 8/2005 |
| EP | 1570344 | 9/2005 |
| EP | 1573514 | 9/2005 |
| EP | 1573515 | 9/2005 |
| EP | 1576471 | 9/2005 |
| JP | 63-234343 | 9/1988 |
| JP | 5108347 | 4/1993 |
| JP | 6282432 | 10/1994 |
| JP | 09-097204 | 4/1997 |
| JP | 2001236496 | 8/2001 |
| JP | 2002-132489 A | 5/2002 |
| JP | 2002149424 | 5/2002 |
| JP | 2002-269063 A | 9/2002 |
| JP | 2002-281079 A | 9/2002 |
| JP | 2006515941 | 6/2006 |
| JP | 2006518056 | 8/2006 |
| JP | 2006518057 | 8/2006 |
| JP | 2006518058 | 8/2006 |
| JP | 2006518495 | 8/2006 |
| KR | 20050084628 | 8/2005 |
| KR | 20050084629 | 8/2005 |
| KR | 20050086423 | 8/2005 |
| KR | 20050086424 | 8/2005 |
| KR | 20050088995 | 9/2005 |
| TW | 470914 | 1/2002 |
| TW | 497074 | 8/2002 |
| TW | 200416594 | 9/2004 |
| WO | 2004042560 | 5/2004 |
| WO | 2004042561 | 5/2004 |
| WO | 2004042562 | 5/2004 |
| WO | 2004042569 | 5/2004 |
| WO | 2004042574 | 5/2004 |
| WO | 2006039710 | 4/2006 |
| WO | 2006039711 | 4/2006 |
| WO | 2006039713 | 4/2006 |

OTHER PUBLICATIONS

Vermeulen F. et al., "Flexible Hardware Acceleration for Multimedia Oriented Microprocessors", Micro-33. Proceedings of the 33rd Annual ACM/IEEE International Symposium on Microarchitecture. Monterey, CA, Dec. 10-13, 2000, Proceedings of the Annual ACM/IEEE International Symposium on Microarchitecture, Los Alamitos, CA: IEEE Comp. Soc, US, Dec. 10, 2000, pp. 171-177.
International Search Report for PCT/US 03/34557, Dec. 21, 2004.
International Search Report for PCT/US 03/34559, Jan. 7, 2005.
Salcic Z et al., "FLIX environment for generation of custom-configurable machines in FPLDs for embedded applications", Microprocessors and Microsystems, IPC Business Press Ltd. London, GB, vol. 23, No. 8-9, Dec. 15, 1999, pp. 513-526.
International Search Report for PCT/US 03/34558; Jun. 16, 2005.
International Search Report for PCT/US2005/035818 dated Aug. 4, 2006.
Bakshi S; Gajski D D; "Partitioning and Pipelining for Performance-Constrained Hardware/Software Systems", IEEE Transactions on Very Large Scale Integration (VLSI) Systems, vol. 7, NR. 4, p. 419-432, (Dec. 1999), XP000869229.
International Search Report for PCT/US 03/34556, Mar. 7, 2006.
Microsoft, "Microsoft Computer Dictionary, 4th Edition," Microsoft Press, 1999, p. 215.
Hennessy and Patterson, "Computer Architecture—A Quantitative Approach, 2nd Edition," 1996, Morgan Kaufman Publishers, Inc., pp. 134,155.
Free Online Dictionary of Computing (FOLDOC), definitions of "FPGA" and "raw data", 1997, http://foldoc.org.
Microsoft, "Microsoft Computer Dictionary, 5th Edition," 2002, pp. 77-78.
Hansen, "The Architecture of Concurrent Programming," prentice-Hall, Inc., 1977, pp. 16-17, 19-20, 24-27, 47-54, 72-73, and 151-152.
"Chips: New Accelerator Chip From Hi/fn to Speed-Up Virtual Private Networks—"VPNs"—Product Announcement", EDGE Publishing, On & About AT&T, Oct. 26, 2008, http://findarticles.com/p/articles/mi_m0UNZ/is_1998_Oct_26/ai_53126574, 2 pages.
Lisa Wu, Chris Weaver, and Todd Austin, "CryptoManiac: A Fast Flexible Architecture for Secure Communication", IEEE 2001, 10 pages.
Examination Report, based on European Application No. 03781552.9 (EP1570344), European Patent Office, Sep. 6, 2005, pp. 4.
Examination Report, based on European Application No. 03781550.3 (EP1573514), European Patent Office, Aug. 31, 2007, pp. 5.
Examination Report, based on European Application No. 03781553.7 (EP1573515), European Patent Office, Jan. 12, 2007, pp. 6.
Final Office Action, U.S. Appl. No. 10/684,053, Dated Jul. 19, 2007.
Final Office Action, U.S. Appl. No. 10/684,053, Dated Nov. 5, 2008.
Final Office Action, U.S. Appl. No. 10/684,057, Dated Apr. 19, 2006.
IEEE VHDL Math Package Study Group, "Package_Math Real Version 0.7 9header only)", May 28, 1993, XP002372288, URL: http://tams-www.informatik.uni-hamburg.de/vhdl/packages/P1076.2/mathpack.vhd, pp. 25.
International Search Report, International Patent Application No. PCTUS2003034555, Dated Dec. 23, 2005, pp. 2.
First Examination Report based on Taiwan Application Serial No. 092130031, dated May 13, 2009, pp. 2 (TW language and English translation submitted herewith).
International Search Report, International Patent Application No. PCTUS2005035813, Mar. 4, 2006 pp. 3.
International Search Report, International Patent Application No. PCTUS2005035814, Dated Feb. 23, 2006, pp. 4.
Office Action, U.S. Appl. No. 10/684,053, Dated Oct. 19, 2006.
Office Action, U.S. Appl. No. 10/684,053, Dated Apr. 8, 2008.
Office Action, U.S. Appl. No. 10/684,053, Dated May 5, 2009.
Office Action, U.S. Appl. No. 10/684,057, Dated Nov. 14, 2005.
Office Action, U.S. Appl. No. 10/684,057, Dated Aug. 7, 2007.
Office Action, U.S. Appl. No. 10/683,932, Dated Feb. 13, 2006.
Office Action, U.S. Appl. No. 10/683,932, Dated Oct. 9, 2007.
Canadian Intellectual Property Office, Office Action Dated Nov. 23, 2009, for Canadian Application No. 2,503,613 Filed May 21, 2004, pp. 4.
Rhett Davis: "MatLAB to RTL Synthesis" Nov. 16, 1998, XP002372287 Internet Archive, URL http://web.archive.org/web/20010702232849/http://bwrc.eecs.berkeley.edu/People/Grad_Students/wrdavis/research/ee244/progress.html>.
European Search Report, European Patent Application No. EP0694847, Dated Jun. 14, 1999.
Ramanathan, et al., (1993), "Adaptive Feedback Techniques for Synchronized Multimedia Retrieval Over Integrated Networks", IEEE/ACM Transactions on Networking, vol. 1, No. 2, pp. 246-259.
Tanenbaum, (1984), "Structured Computer Organization, 2nd Edition", pp. 10-12.
Venkat Rangan P., Harrick M. Vin, and Srinivas Ramanathan (1992) "Designing an On-Demand Multimedia Service"; IEEE Communications Magazine, vol. 30, No. 7, Jul. 1992, pp. 56-65.
Harrick M. Vin and Venkat Rangan P., (1992) "System Support for Computer Mediated Multimedia Collaborations"; Sharing Perspectives, Toronto, Oct. 31-Nov. 4, 1992; pp. 203-209.
Korean Intellectual Property Office, Office Action for Korean Patent Application No. 10-2005-7007750 dated Mar. 9, 2010, pp. 2.
European Patent Office Office Action for European Patent Application No. 03 781 551.1-1243 dated Dec. 3, 2010, pp. 2.
Todd Greanier, Serialization API, Jul. 2000, [online], [retrieved on Jun. 18, 2009]. Retrieved from the Internet, <java.sun.com/developer/technicalArticles/Programming/serialization/>, pp. 1-7 as printed.
Ann Wollrath, Roger Riggs, and Jim Waldo, "A Distributed Object Model for the Java System", Jun. 1996, [online], [retrieved on Jun.

18, 2009]. Retrieved from the Internet <usenix.org/publications/library/proceedings/coots96/wollrath.html>, pp. 1-14 as printed.

Australian Patent Office—Examiner's Report No. 3 Dated Jul. 13, 2010, for Australian Patent Application No. 2003287320.

Erich Gamma Richard Helm Ralph Johnson John Vlissides, "Design Patterns Elements of Reusab e Object-Oriented Software", Copyright 1995 by Addison Wesley Longman, Inc, pp. 21.

United States Patent Office, Office Action for U.S. Appl. No. 10/683,929, dated Sep. 24, 2010, pp. 40.

Andree Filipov, "Application of Reconfigurable Computing to Acoustic Sensors", Oct. 2000, U.S. Army Research Laboratory, retieved from Internet URL: stormingmedia.us/61/6122/A612293, pp. 1-16.

Brian Oki, Manfred Pfluegl, Alex Siegel, and Dale Skeen "THe information Bus—An Architecture for Extensible Distributed Systems" 1993, pp. 58-68.

* cited by examiner

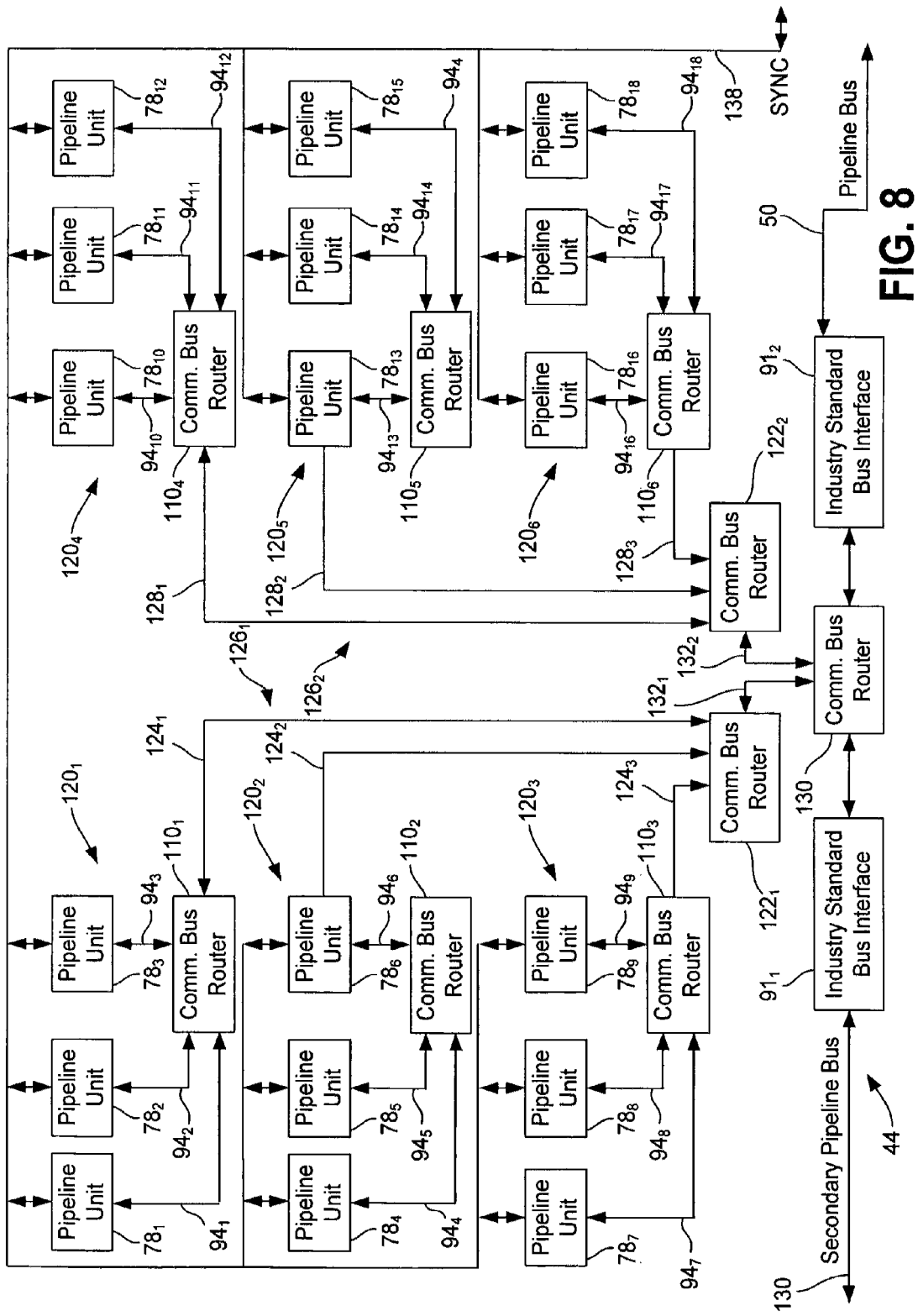

PIPELINE ACCELERATOR HAVING MULTIPLE PIPELINE UNITS AND RELATED COMPUTING MACHINE AND METHOD

CLAIM OF PRIORITY

This application is a continuation of patent application Ser. No. 10/683,932 filed on Oct. 9, 2003, now U.S. Pat. No. 7,386,704 which claims priority to U.S. Provisional Application Ser. No. 60/422,503, filed on Oct. 31, 2002, which is incorporated by reference.

CROSS REFERENCE TO RELATED APPLICATIONS

This application is related to U.S. Publication Nos. 2004/0133763 entitled IMPROVED COMPUTING ARCHITECTURE AND RELATED SYSTEM AND METHOD, 2004/0181621 entitled COMPUTING MACHINE HAVING IMPROVED COMPUTING ARCHITECTURE AND RELATED SYSTEM AND METHOD, 2004/0136241 entitled PIPELINE ACCELERATOR FOR IMPROVED COMPUTING ARCHITECTURE AND RELATED SYSTEM AND METHOD, and 2004/0170070 entitled PROGRAMMABLE CIRCUIT AND RELATED COMPUTING MACHINE AND METHOD, which have a common filing date and owner.

BACKGROUND

A common computing architecture for processing relatively large amounts of data in a relatively short period of time includes multiple interconnected processors that share the processing burden. By sharing the processing burden, these multiple processors can often process the data more quickly than a single processor can for a given clock frequency. For example, each of the processors can process a respective portion of the data or execute a respective portion of a processing algorithm.

FIG. 1 is a schematic block diagram of a conventional computing machine 10 having a multi-processor architecture. The machine 10 includes a master processor 12 and coprocessors $14_1$-$14_n$, which communicate with each other and the master processor via a bus 16, an input port 18 for receiving raw data from a remote device (not shown in FIG. 1), and an output port 20 for providing processed data to the remote source. The machine 10 also includes a memory 22 for the master processor 12, respective memories $24_1$-$24_n$ for the coprocessors $14_1$-$14_n$, and a memory 26 that the master processor and coprocessors share via the bus 16. The memory 22 serves as both a program and a working memory for the master processor 12, and each memory $24_1$-$24_n$ serves as both a program and a working memory for a respective coprocessor $14_1$-$14_n$. The shared memory 26 allows the master processor 12 and the coprocessors 14 to transfer data among themselves, and from/to the remote device via the ports 18 and 20, respectively. The master processor 12 and the coprocessors 14 also receive a common clock signal that controls the speed at which the machine 10 processes the raw data.

In general, the computing machine 10 effectively divides the processing of raw data among the master processor 12 and the coprocessors 14. The remote source (not shown in FIG. 1) such as a sonar array loads the raw data via the port 18 into a section of the shared memory 26, which acts as a first-in-first-out (FIFO) buffer (not shown) for the raw data. The master processor 12 retrieves the raw data from the memory 26 via the bus 16, and then the master processor and the coprocessors 14 process the raw data, transferring data among themselves as necessary via the bus 16. The master processor 12 loads the processed data into another FIFO buffer (not shown) defined in the shared memory 26, and the remote source retrieves the processed data from this FIFO via the port 20.

In an example of operation, the computing machine 10 processes the raw data by sequentially performing n+1 respective operations on the raw data, where these operations together compose a processing algorithm such as a Fast Fourier Transform (FFT). More specifically, the machine 10 forms a data-processing pipeline from the master processor 12 and the coprocessors 14. For a given frequency of the clock signal, such a pipeline often allows the machine 10 to process the raw data faster than a machine having only a single processor.

After retrieving the raw data from the raw-data FIFO (not shown) in the memory 26, the master processor 12 performs a first operation, such as a trigonometric function, on the raw data. This operation yields a first result, which the processor 12 stores in a first-result FIFO (not shown) defined within the memory 26. Typically, the processor 12 executes a program stored in the memory 22, and performs the above-described actions under the control of the program. The processor 12 may also use the memory 22 as working memory to temporarily store data that the processor generates at intermediate intervals of the first operation.

Next, after retrieving the first result from the first-result FIFO (not shown) in the memory 26, the coprocessor $14_1$ performs a second operation, such as a logarithmic function, on the first result. This second operation yields a second result, which the coprocessor $14_1$ stores in a second-result FIFO (not shown) defined within the memory 26. Typically, the coprocessor $14_1$ executes a program stored in the memory $24_1$, and performs the above-described actions under the control of the program. The coprocessor $14_1$ may also use the memory $24_1$ as working memory to temporarily store data that the coprocessor generates at intermediate intervals of the second operation.

Then, the coprocessors $14_2$-$14_n$ sequentially perform third—$n^{th}$ operations on the second—$(n-1)^{th}$ results in a manner similar to that discussed above for the coprocessor $14_1$.

The $n^{th}$ operation, which is performed by the coprocessor $14_n$, yields the final result, i.e., the processed data. The coprocessor $14_n$ loads the processed data into a processed-data FIFO (not shown) defined within the memory 26, and the remote device (not shown in FIG. 1) retrieves the processed data from this FIFO.

Because the master processor 12 and coprocessors 14 are simultaneously performing different operations of the processing algorithm, the computing machine 10 is often able to process the raw data faster than a computing machine having a single processor that sequentially performs the different operations.

Specifically, the single processor cannot retrieve a new set of the raw data until it performs all n+1 operations on the previous set of raw data. But using the pipeline technique discussed above, the master processor 12 can retrieve a new set of raw data after performing only the first operation. Consequently, for a given clock frequency, this pipeline technique can increase the speed at which the machine 10 processes the raw data by a factor of approximately n+1 as compared to a single-processor machine (not shown in FIG. 1).

Alternatively, the computing machine 10 may process the raw data in parallel by simultaneously performing n+1 instances of a processing algorithm, such as an FFT, on the raw data. That is, if the algorithm includes n+1 sequential operations as described above in the previous example, then each of the master processor 12 and the coprocessors 14 sequentially perform all n+1 operations on respective sets of the raw data. Consequently, for a given clock frequency, this parallel-processing technique, like the above-described pipeline technique, can increase the speed at which the machine 10 processes the raw data by a factor of approximately n+1 as compared to a single-processor machine (not shown in FIG. 1).

Unfortunately, although the computing machine 10 can process data more quickly than a single-processor computing machine (not shown in FIG. 1), the data-processing speed of the machine 10 is often significantly less than the frequency of the processor clock. Specifically, the data-processing speed of the computing machine 10 is limited by the time that the master processor 12 and coprocessors 14 require to process data. For brevity, an example of this speed limitation is discussed in conjunction with the master processor 12, although it is understood that this discussion also applies to the coprocessors 14. As discussed above, the master processor 12 executes a program that controls the processor to manipulate data in a desired manner. This program includes a sequence of instructions that the processor 12 executes. Unfortunately, the processor 12 typically requires multiple clock cycles to execute a single instruction, and often must execute multiple instructions to process a single value of data. For example, suppose that the processor 12 is to multiply a first data value A (not shown) by a second data value B (not shown). During a first clock cycle, the processor 12 retrieves a multiply instruction from the memory 22. During second and third clock cycles, the processor 12 respectively retrieves A and B from the memory 26. During a fourth clock cycle, the processor 12 multiplies A and B, and, during a fifth clock cycle, stores the resulting product in the memory 22 or 26 or provides the resulting product to the remote device (not shown). This is a best-case scenario, because in many cases the processor 12 requires additional clock cycles for overhead tasks such as initializing and closing counters. Therefore, at best the processor 12 requires five clock cycles, or an average of 2.5 clock cycles per data value, to process A and B.

Consequently, the speed at which the computing machine 10 processes data is often significantly lower than the frequency of the clock that drives the master processor 12 and the coprocessors 14. For example, if the processor 12 is clocked at 1.0 Gigahertz (GHz) but requires an average of 2.5 clock cycles per data value, then the effective data-processing speed equals (1.0 GHz)/2.5=0.4 GHz. This effective data-processing speed is often characterized in units of operations per second. Therefore, in this example, for a clock speed of 1.0 GHz, the processor 12 would be rated with a data-processing speed of 0.4 Gigaoperations/second (Gops).

FIG. 2 is a block diagram of a hardwired data pipeline 30 that can typically process data faster than a processor can for a given clock frequency, and often at substantially the same rate at which the pipeline is clocked. The pipeline 30 includes operator circuits $32_1$-$32_n$, which each perform a respective operation on respective data without executing program instructions. That is, the desired operation is "burned in" to a circuit 32 such that it implements the operation automatically, without the need of program instructions. By eliminating the overhead associated with executing program instructions, the pipeline 30 can typically perform more operations per second than a processor can for a given clock frequency.

For example, the pipeline 30 can often solve the following equation faster than a processor can for a given clock frequency:

$$Y(x_k)=(5x_k+3)2^{xk}$$

where $x_k$ represents a sequence of raw data values. In this example, the operator circuit $32_1$ is a multiplier that calculates $5x_k$, the circuit $32_2$ is an adder that calculates $5x_k+3$, and the circuit $32_n$ (n=3) is a multiplier that calculates $(5x_k+3)2^{xk}$.

During a first clock cycle k=1, the circuit $32_1$ receives data value $x_1$ and multiplies it by 5 to generate $5x_1$.

During a second clock cycle k=2, the circuit $32_2$ receives $5x_1$ from the circuit $32_1$ and adds 3 to generate $5x_1+3$. Also, during the second clock cycle, the circuit $32_1$ generates $5x_2$.

During a third clock cycle k=3, the circuit $32_3$ receives $5x_1+3$ from the circuit $32_2$ and multiplies by $2^{x1}$ (effectively left shifts $5x_1+3$ by $x_1$) to generate the first result $(5x_1+3)2^{x1}$. Also during the third clock cycle, the circuit $32_1$ generates $5x_3$ and the circuit $32_2$ generates $5x_2+3$.

The pipeline 30 continues processing subsequent raw data values $x_k$ in this manner until all the raw data values are processed.

Consequently, a delay of two clock cycles after receiving a raw data value $x_1$—this delay is often called the latency of the pipeline 30—the pipeline generates the result $(5x_1+3)2^{x1}$, and thereafter generates one result—e.g., $(5x_2+3)2^{x2}$, $(5x_3+3)2^{x3}$, ..., $5x_n+3)2^{xn}$—each clock cycle.

Disregarding the latency, the pipeline 30 thus has a data-processing speed equal to the clock speed. In comparison, assuming that the master processor 12 and coprocessors 14 (FIG. 1) have data-processing speeds that are 0.4 times the clock speed as in the above example, the pipeline 30 can process data 2.5 times faster than the computing machine 10 (FIG. 1) for a given clock speed.

Still referring to FIG. 2, a designer may choose to implement the pipeline 30 in a programmable logic IC (PLIC), such as a field-programmable gate array (FPGA), because a PLIC allows more design and modification flexibility than does an application specific IC (ASIC). To configure the hardwired connections within a PLIC, the designer merely sets interconnection-configuration registers disposed within the PLIC to predetermined binary states. The combination of all these binary states is often called "firmware." Typically, the designer loads this firmware into a nonvolatile memory (not shown in FIG. 2) that is coupled to the PLIC. When one "turns on" the PLIC, it downloads the firmware from the memory into the interconnection-configuration registers. Therefore, to modify the functioning of the PLIC, the designer merely modifies the firmware and allows the PLIC to download the modified firmware into the interconnection-configuration registers. This ability to modify the PLIC by merely modifying the firmware is particularly useful during the prototyping stage and for upgrading the pipeline 30 "in the field".

Unfortunately, the hardwired pipeline 30 may not be the best choice to execute algorithms that entail significant decision making, particularly nested decision making. A processor can typically execute a nested-decision-making instruction (e.g., a nested conditional instruction such as "if A, then do B, else if C, do D, ..., else do n") approximately as fast as it can execute an operational instruction (e.g., "A+B") of comparable length. But although the pipeline 30 may be able to make a relatively simple decision (e.g., "A>B?") efficiently, it typically cannot execute a nested decision (e.g., "if A, then do B, else if C, do D, ..., else do n") as efficiently as a processor can. One reason for this inefficiency is that the pipeline 30 may have little on-board memory, and thus may need to access external working/program memory (not shown). And although one may be able to design the pipeline 30 to execute such a nested decision, the size and complexity of the required circuitry often makes such a design impractical, particularly where an algorithm includes multiple different nested decisions.

Consequently, processors are typically used in applications that require significant decision making, and hardwired pipelines are typically limited to "number crunching" applications that entail little or no decision making.

Furthermore, as discussed below, it is typically much easier for one to design/modify a processor-based computing machine, such as the computing machine 10 of FIG. 1, than it is to design/modify a hardwired pipeline such as the pipeline 30 of FIG. 2, particularly where the pipeline 30 includes multiple PLICs.

Computing components, such as processors and their peripherals (e.g., memory), typically include industry-standard communication interfaces that facilitate the interconnection of the components to form a processor-based computing machine.

Typically, a standard communication interface includes two layers: a physical layer and a services layer.

The physical layer includes the circuitry and the corresponding circuit interconnections that form the interface and the operating parameters of this circuitry. For example, the physical layer includes the pins that connect the component to a bus, the buffers that latch data received from the pins, and the drivers that drive signals onto the pins. The operating parameters include the acceptable voltage range of the data signals that the pins receive, the signal timing for writing and reading data, and the supported modes of operation (e.g., burst mode, page mode). Conventional physical layers include transistor-transistor logic (TTL) and RAMBUS.

The services layer includes the protocol by which a computing component transfers data. The protocol defines the format of the data and the manner in which the component sends and receives the formatted data. Conventional communication protocols include file-transfer protocol (FTP) and transmission control protocol/internet protocol (TCP/IP).

Consequently, because manufacturers and others typically design computing components having industry-standard communication interfaces, one can typically design the interface of such a component and interconnect it to other computing components with relatively little effort. This allows one to devote most of his time to designing the other portions of the computing machine, and to easily modify the machine by adding or removing components.

Designing a computing component that supports an industry-standard communication interface allows one to save design time by using an existing physical-layer design from a design library. This also insures that he/she can easily interface the component to off-the-shelf computing components.

And designing a computing machine using computing components that support a common industry-standard communication interface allows the designer to interconnect the components with little time and effort. Because the components support a common interface, the designer can interconnect them via a system bus with little design effort. And because the supported interface is an industry standard, one can easily modify the machine. For example, one can add different components and peripherals to the machine as the system design evolves, or can easily add/design next-generation components as the technology evolves. Furthermore, because the components support a common industry-standard services layer, one can incorporate into the computing machine's software an existing software module that implements the corresponding protocol. Therefore, one can interface the components with little effort because the interface design is essentially already in place, and thus can focus on designing the portions (e.g., software) of the machine that cause the machine to perform the desired function(s).

But unfortunately, there are no known industry-standard services layers for components, such as PLICs, used to form hardwired pipelines such as the pipeline 30 of FIG. 2.

Consequently, to design a pipeline having multiple PLICs, one typically spends a significant amount of time and exerts a significant effort designing "from scratch" and debugging the services layer of the communication interface between the PLICs. Typically, such an ad hoc services layer depends on the parameters of the data being transferred between the PLICs. Likewise, to design a pipeline that interfaces to a processor, one would have to spend a significant amount of time and exert a significant effort in designing and debugging the services layer of the communication interface between the pipeline and the processor.

Similarly, to modify such a pipeline by adding a PLIC to it, one typically spends a significant amount of time and exerts a significant effort designing and debugging the services layer of the communication interface between the added PLIC and the existing PLICs. Likewise, to modify a pipeline by adding a processor, or to modify a computing machine by adding a pipeline, one would have to spend a significant amount of time and exert a significant effort in designing and debugging the services layer of the communication interface between the pipeline and processor.

Consequently, referring to FIGS. 1 and 2, because of the difficulties in interfacing multiple PLICs and in interfacing a processor to a pipeline, one is often forced to make significant tradeoffs when designing a computing machine. For example, with a processor-based computing machine, one is forced to trade number-crunching speed and design/modification flexibility for complex decision-making ability. Conversely, with a hardwired pipeline-based computing machine, one is forced to trade complex-decision-making ability and design/modification flexibility for number-crunching speed. Furthermore, because of the difficulties in interfacing multiple PLICs, it is often impractical for one to design a pipeline-based machine having more than a few PLICs. As a result, a practical pipeline-based machine often has limited functionality. And because of the difficulties in interfacing a processor to a PLIC, it would be impractical to interface a processor to more than one PLIC. As a result, the benefits obtained by combining a processor and a pipeline would be minimal.

Therefore, a need has arisen for a new computing architecture that allows one to combine the decision-making ability of a processor-based machine with the number-crunching speed of a hardwired-pipeline-based machine.

SUMMARY

According to an embodiment of the invention, a pipeline accelerator includes a bus and a plurality of pipeline units each coupled to the bus and each including at least one respective hardwired-pipeline circuit.

By including a plurality of pipeline units in the pipeline accelerator, one can increase the accelerator's data-processing performance as compared to a single-pipeline-unit accelerator. Furthermore, by designing the pipeline units so that they communicate with each other and with other peers via a common bus, one can alter the number of pipeline units, and thus alter the configuration and functionality of the accelerator, by merely coupling or uncoupling pipeline units to or from the bus. This eliminates the need to design or redesign the pipeline-unit interfaces each time one alters one of the pipeline units or alters the number of pipeline units within the accelerator.

BRIEF DESCRIPTION OF THE DRAWINGS

FIG. 8 is a block diagram of the pipeline accelerator of FIG. 3 including groups of multiple pipeline units according to an embodiment of the invention.

DETAILED DESCRIPTION

Figure 1:
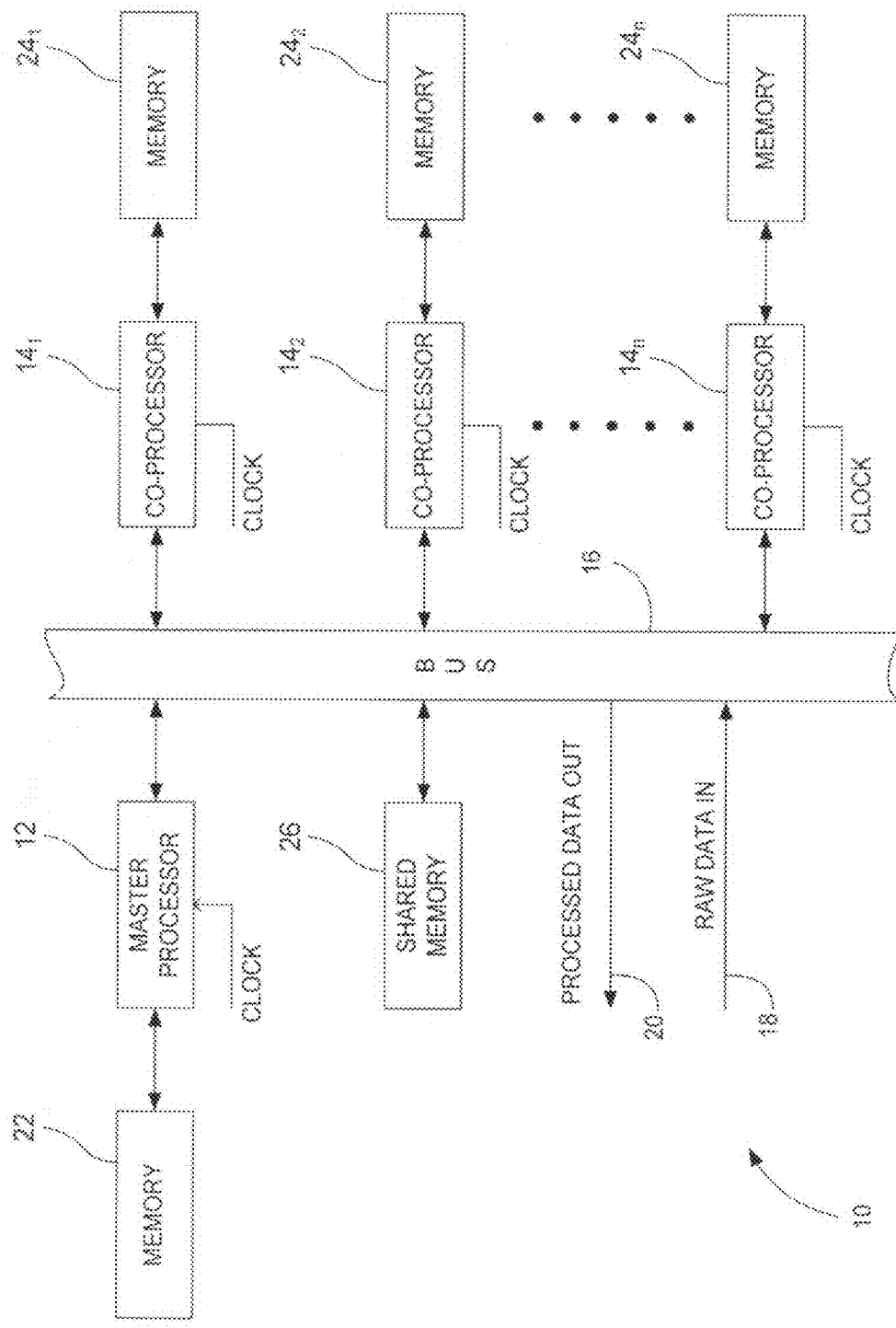
FIG. 1 is a block diagram of a computing machine having a conventional multi-processor architecture.
Figure 2:
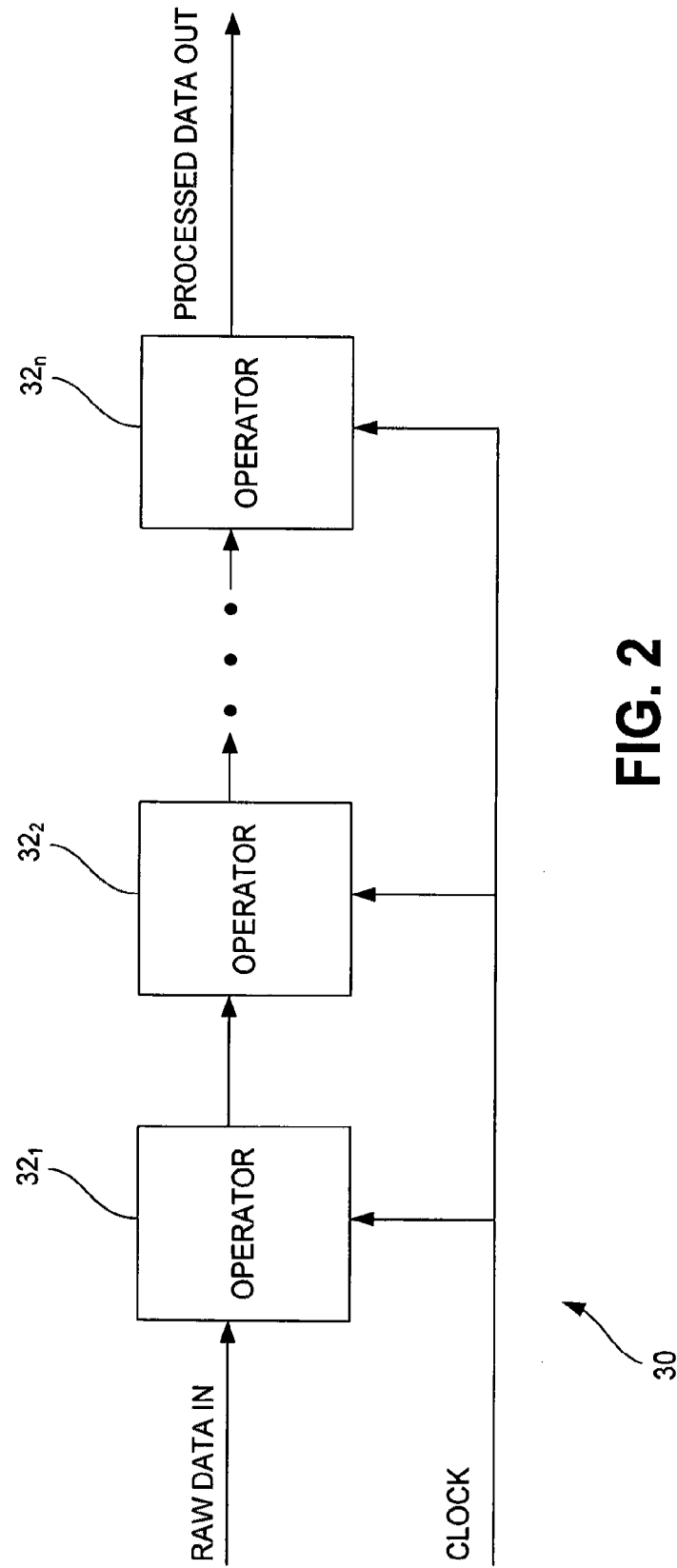
FIG. 2 is a block diagram of a conventional hardwired pipeline.
Figure 3:
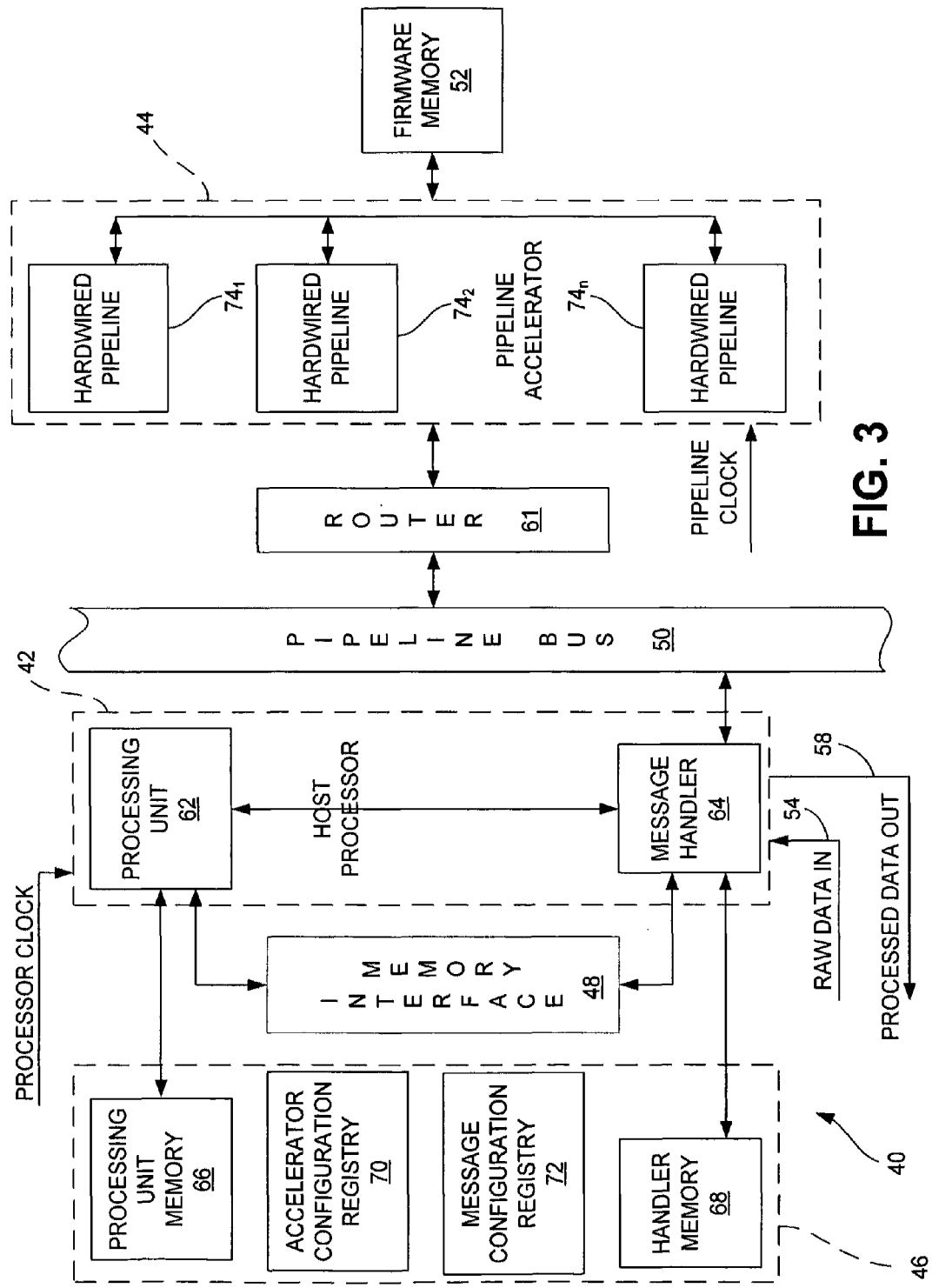
FIG. 3 is a block diagram of a computing machine having a peer-vector architecture according to an embodiment of the invention.

FIG. 3 is a schematic block diagram of a computing machine 40, which has a peer-vector architecture according to an embodiment of the invention. In addition to a host processor 42, the peer-vector machine 40 includes a pipeline accelerator 44, which performs at least a portion of the data processing, and which thus effectively replaces the bank of coprocessors 14 in the computing machine 10 of FIG. 1. Therefore, the host-processor 42 and the accelerator 44 (or units thereof as discussed below) are "peers" that can transfer data vectors back and forth. Because the accelerator 44 does not execute program instructions, it typically performs mathematically intensive operations on data significantly faster than a bank of coprocessors can for a given clock frequency. Consequently, by combining the decision-making ability of the processor 42 and the number-crunching ability of the accelerator 44, the machine 40 has the same abilities as, but can often process data faster than, a conventional computing machine such as the machine 10. Furthermore, as discussed below, providing the accelerator 44 with a communication interface that is compatible with the communication interface of the host processor 42 facilitates the design and modification of the machine 40, particularly where the processor's communication interface is an industry standard. And where the accelerator 44 includes multiple pipeline units (e.g., PLIC-based circuits), providing each of these units with the same communication interface facilitates the design and modification of the accelerator, particularly where the communication interfaces are compatible with an industry-standard interface. Moreover, the machine 40 may also provide other advantages as described below and in the previously cited patent applications.

Still referring to FIG. 3, in addition to the host processor 42 and the pipeline accelerator 44, the peer-vector computing machine 40 includes a processor memory 46, an interface memory 48, a pipeline bus 50, one or more firmware memories 52, an optional raw-data input port 54, a processed-data output port 58, and an optional router 61.

The host processor 42 includes a processing unit 62 and a message handler 64, and the processor memory 46 includes a processing-unit memory 66 and a handler memory 68, which respectively serve as both program and working memories for the processor unit and the message handler. The processor memory 46 also includes an accelerator-configuration registry 70 and a message-configuration registry 72, which store respective configuration data that allow the host processor 42 to configure the functioning of the accelerator 44 and the format of the messages that the message handler 64 sends and receives.

The pipeline accelerator 44 is disposed on at least one PLIC (FIG. 4) and includes hardwired pipelines $74_1$-$74_n$, which process respective data without executing program instructions. The firmware memory 52 stores the configuration firmware for the accelerator 44. If the accelerator 44 is disposed on multiple PLICs, then these PLICs and their respective firmware memories may be disposed in multiple pipeline units, which are discussed further below in conjunction with FIGS. 4-8. Alternatively, the accelerator 44 may be disposed on at least one ASIC, and thus may have internal interconnections that are unconfigurable once the ASIC is formed. In this alternative, the machine 40 may omit the firmware memory 52. Furthermore, although the accelerator 44 is shown including multiple pipelines $74_1$-$74_n$, it may include only a single pipeline. In addition, although not shown, the accelerator 44 may include one or more processors such as a digital-signal processor (DSP). Moreover, although not shown, the accelerator 44 may include a data input port and/or a data output port.

And although the host processor 42 and pipeline accelerator 44 are discussed as being disposed on different ICs, the host processor and pipeline accelerator may be disposed on the same IC.

The general operation of the peer-vector machine 40 is discussed in previously cited U.S. Publication No. 2004/0133763 entitled IMPROVED COMPUTING ARCHITECTURE AND RELATED SYSTEM AND METHOD, the structure and operation of the host processor 42 is discussed in previously cited U.S. Publication No. 2004/0181621 entitled COMPUTING MACHINE HAVING IMPROVED COMPUTING ARCHITECTURE AND RELATED SYSTEM AND METHOD, and the structure and operation of the pipeline accelerator 44 is discussed in previously cited U.S. Publication No. 2004/0136241 entitled PIPELINE ACCELERATOR FOR IMPROVED COMPUTING ARCHITECTURE AND RELATED SYSTEM AND METHOD and below in conjunction with FIGS. 4-8.

Figure 4:
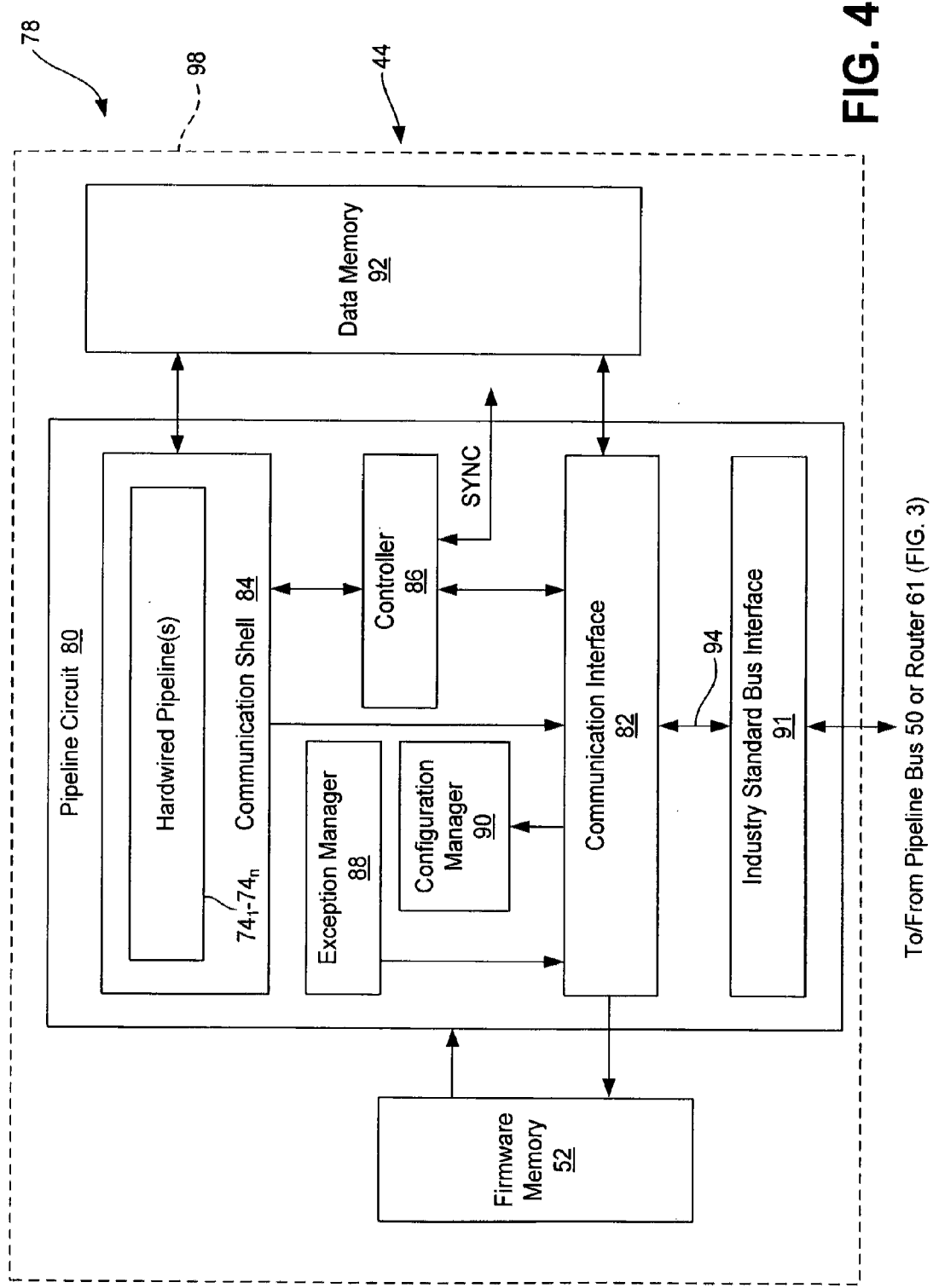
FIG. 4 is a block diagram of a pipeline unit of the pipeline accelerator of FIG. 3 according to an embodiment of the invention.

FIG. 4 is a block diagram of a unit 78 of the pipeline accelerator 44 of FIG. 3 according to an embodiment of the invention.

The accelerator 44 includes one or more such pipeline units 78 (only one shown in FIG. 4), each of which includes a pipeline circuit 80, such as a PLIC or an ASIC. As discussed further below and in previously cited U.S. Publication No. 2004/0136241 entitled PIPELINE ACCELERATOR FOR IMPROVED COMPUTING ARCHITECTURE AND RELATED SYSTEM AND METHOD, each pipeline unit 78 is a "peer" of the host processor 42 (FIG. 3) and of the other pipeline units of the accelerator 44. That is, each pipeline unit 78 can communicate directly with the host processor 42 or with any other pipeline unit. Thus, this peer-vector architecture prevents data "bottlenecks" that otherwise might occur if all of the pipeline units 78 communicated through a central location such as a master pipeline unit (not shown) or the host processor 42. Furthermore, this architecture allows one to add or remove peers from the peer-vector machine 40 (FIG. 3) without significant modifications to the machine.

The pipeline circuit 80 includes a communication interface 82, which transfers data between a peer, such as the host processor 42 (FIG. 3), and the following other components of the pipeline circuit: the hardwired pipelines $74_1$-$74_n$ via a communication shell 84, a pipeline controller 86, an exception manager 88, and a configuration manager 90. The pipeline circuit 80 may also include an industry-standard bus interface 91 and a communication bus 93, which connects the interface 82 to the interface 91. Alternatively, the functionality of the interface 91 may be included within the communication interface 82 and the bus 93 omitted.

By designing the components of the pipeline circuit 80 as separate modules, one can often simplify the design of the pipeline circuit. That is, one can design and test each of these components separately, and then integrate them much like one does when designing software or a processor-based computing system (such as the system 10 of FIG. 1). In addition, one can save in a library (not shown) hardware description language (HDL) that defines these components—particularly components, such as the communication interface 82, that designers will probably use frequently in other pipeline designs—thus reducing the design and test time of future pipeline designs that use the same components. That is, by using the HDL from the library, the designer need not redesign previously implemented components from scratch, and thus can focus his efforts on the design of components that were not previously implemented, or on the modification of previously implemented components. Moreover, one can save in the library HDL that defines multiple versions of the pipeline circuit 80 or multiple versions of the entire pipeline accelerator 44 so that one can pick and choose among existing designs.

Still referring to FIG. 4, the communication interface 82 sends and receives (via the bus interface 91 of present) data in a format recognized by the message handler 64 (FIG. 3), and thus typically facilitates the design and modification of the peer-vector machine 40 (FIG. 3). For example, if the data format is an industry standard such as the Rapid I/O format, then one need not design a custom interface between the host processor 42 and the pipeline unit 78. Furthermore, by allowing the pipeline unit 78 to communicate with other peers, such as the host processor 42 (FIG. 3), via the pipeline bus 50 instead of via a non-bus interface, one can change the number of pipeline units by merely connecting or disconnecting them (or the circuit cards that hold them) to the pipeline bus instead of redesigning a non-bus interface from scratch each time a pipeline unit is added or removed.

The hardwired pipelines $74_1$-$74_n$ perform respective operations on data as discussed above in conjunction with FIG. 3 and in previously cited U.S. Publication Nos. 2004/0133763 entitled IMPROVED COMPUTING ARCHITECTURE AND RELATED SYSTEM AND METHOD and 2004/0136241 entitled PIPELINE ACCELERATOR FOR IMPROVED COMPUTING ARCHITECTURE AND RELATED SYSTEM AND METHOD, and the communication shell 84 interfaces the pipelines to the other components of the pipeline circuit 80 and to other circuits (such as a data memory 92 discussed below) of the pipeline unit 78.

The controller 86 synchronizes the hardwired pipelines $74_1$-$74_n$ in response to SYNC signals and special pipeline-bus communications (i.e., "events") from other peers, and monitors and controls the sequence in which the pipelines perform their respective data operations. For example, a peer, such as the host processor 42, may pulse a SYNC signal or send an event to the pipeline unit 78 via the pipeline bus 50 to indicate that the peer has finished sending a block of data to the pipeline unit and to cause the hardwired pipelines $74_1$-$74_n$ to begin processing this data. Typically, a SYNC signal is used to synchronize a time-critical operation, and an event is used to synchronize a non-time-critical operation. Typically, an event is a data-less communication that is often called a "doorbell". But an event may include data, in which case it is often called an "event message". SYNC signals and events are discussed further in previously cited U.S. Publication No. 2004/0136241 entitled PIPELINE ACCELERATOR FOR IMPROVED COMPUTING ARCHITECTURE AND RELATED SYSTEM AND METHOD.

The exception manager 88 monitors the status of the hardwired pipelines $74_1$-$74_n$, the communication interface 82, the communication shell 84, the controller 86, and the bus interface 91 (if present), and reports exceptions to the host processor 42 (FIG. 3). For example, if a buffer in the communication interface 82 overflows, then the exception manager 88 reports this to the host processor 42. The exception manager may also correct, or attempt to correct, the problem giving rise to the exception. For example, for an overflowing buffer, the exception manager 88 may increase the size of the buffer, either directly or via the configuration manager 90 as discussed below.

The configuration manager 90 sets the soft configuration of the hardwired pipelines $74_1$-$74_n$, the communication interface 82, the communication shell 84, the controller 86, the exception manager 88, and the interface 91 (if present) in response to soft-configuration data from the host processor 42 (FIG. 3)—as discussed in previously cited U.S. Publication No. 2004/0133763 entitled IMPROVED COMPUTING ARCHITECTURE AND RELATED SYSTEM AND METHOD, the hard configuration denotes the actual topology, on the transistor and circuit-block level, of the pipeline circuit 80, and the soft configuration denotes the physical parameters (e.g., data width, table size) of the hard-configured components. That is, soft configuration data is similar to the data that can be loaded into a register of a processor (not shown in FIG. 4) to set the operating mode (e.g., burst-memory mode) of the processor. For example, the host processor 42 may send soft-configuration data that causes the configuration manager 90 to set the number and respective priority levels of data and event queues in the communication interface 82. The exception manager 88 may also send soft-configuration data that causes the configuration manager 90 to, e.g., increase the size of an overflowing buffer in the communication interface 82.

The industry-standard bus interface 91 is a conventional bus-interface circuit that reduces the size and complexity of the communication interface 82 by effectively offloading some of the interface circuitry from the communication interface. Therefore, if one wishes to change the parameters of the pipeline bus 50 or router 61 (FIG. 3), then he need only modify the interface 91 and not the communication interface 82. Alternatively, one may dispose the interface 91 in an IC (not shown) that is external to the pipeline circuit 80. Offloading the interface 91 from the pipeline circuit 80 frees up resources on the pipeline circuit for use in, e.g., the hardwired pipelines $74_1$-$74_n$ and the controller 86. Or, as discussed above, the bus interface 91 may be part of the communication interface 82.

Still referring to FIG. 4, in addition to the pipeline circuit 80, the pipeline unit 78 of the accelerator 44 includes the data memory 92, and, if the pipeline circuit is a PLIC, a firmware memory 52.

The data memory 92 buffers data as it flows between another peer, such as the host processor 42 (FIG. 3), and the hardwired pipelines $74_1$-$74_n$, and is also a working memory for the hardwired pipelines. The communication interface 82 interfaces the data memory 92 to the pipeline bus 50 (via the communication bus 94 and industry-standard interface 91 if present), and the communication shell 84 interfaces the data memory to the hardwired pipelines $74_1$-$74_n$.

The data memory 92 (or other portion of the pipeline unit 78) may also store a profile of the pipeline unit. The profile describes the pipeline unit 78 sufficiently for the host processor 42 (FIG. 3) to appropriately configure itself, the pipeline unit, and other peers of the peer-vector machine 40 (FIG. 3) for intercommunication. For example, the profile may identify the data operations and communication protocols that the pipeline unit 78 is capable of implementing. Consequently, by reading the profile during initialization of the peer-vector machine 40, the host processor 42 can properly configure the message handler 64 (FIG. 3) to communicate with the pipeline unit 78. This technique is analogous to the "plug and play" technique by which a computer can configure itself to communicate with a newly installed peripheral such as a disk drive. Configuration of the host processor 42 and pipeline unit 78 are discussed further in previously cited U.S. Publication Nos. 2004/0133763 entitled IMPROVED COMPUTING ARCHITECTURE AND RELATED SYSTEM AND METHOD and 2004/0170070 entitled PROGRAMMABLE CIRCUIT AND RELATED COMPUTING MACHINE AND METHOD.

As discussed above in conjunction with FIG. 3, where the pipeline circuit 80 is a PLIC, the firmware memory 52 stores the firmware that sets the hard configuration of the pipeline circuit. The memory 52 loads the firmware into the pipeline circuit 80 during the configuration of the accelerator 44, and may receive modified firmware from the host processor 42 (FIG. 3) via the communication interface 82 during or after the configuration of the accelerator. The loading and receiving of firmware is further discussed in previously cited U.S. Publication Nos. 2004/0133763 entitled IMPROVED COMPUTING ARCHITECTURE AND RELATED SYSTEM AND METHOD, 2004/0181621 entitled COMPUTING MACHINE HAVING IMPROVED COMPUTING ARCHITECTURE AND RELATED SYSTEM AND METHOD, and 2004/0170070 entitled PROGRAMMABLE CIRCUIT AND RELATED COMPUTING MACHINE AND METHOD.

Still referring to FIG. 4, the pipeline unit 78 may include a circuit board or card 98 on which are disposed the pipeline circuit 80, data memory 92, and firmware memory 52. The circuit board 98 may be plugged into a pipeline-bus connector (not shown) much like a daughter card can be plugged into a slot of a mother board in a personal computer (not shown). Although not shown, the pipeline unit 78 may include conventional ICs and components such as a power regulator and a power sequencer; these ICs/components may also be disposed on the card 98 as is known.

Further details of the structure and operation of the pipeline unit 78 are discussed in previously cited U.S. Publication No. 2004/0136241 entitled PIPELINE ACCELERATOR FOR IMPROVED COMPUTING ARCHITECTURE AND RELATED SYSTEM AND METHOD.

Figure 5:
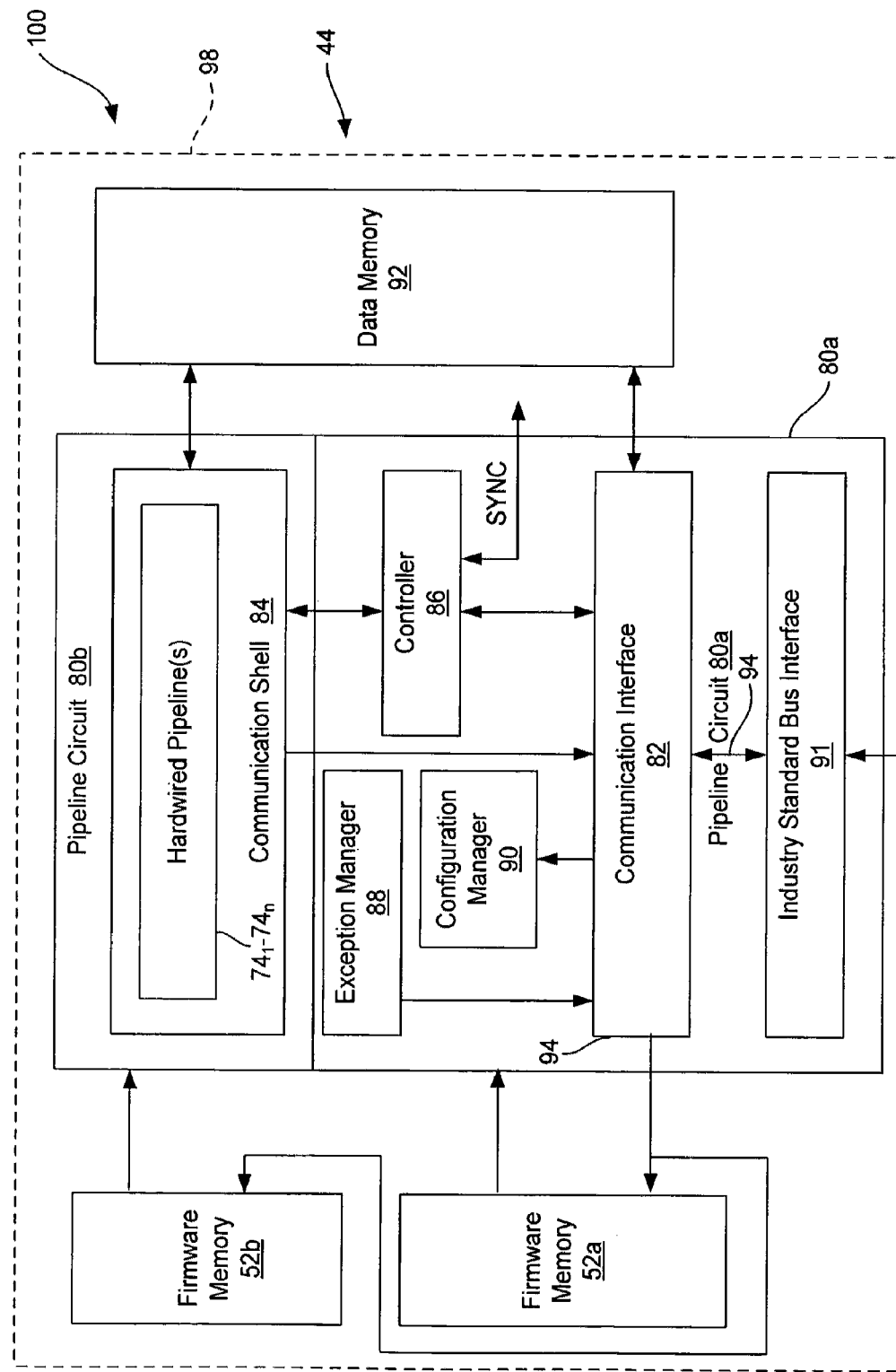
FIG. 5 is a block diagram of a pipeline unit of the pipeline accelerator of FIG. 3 according to another embodiment of the invention.

FIG. 5 is a block diagram of a pipeline unit 100 of the pipeline accelerator 44 of FIG. 3 according to another embodiment of the invention. The pipeline unit 100 is similar to the pipeline unit 78 of FIG. 4 except that the pipeline unit 100 includes multiple pipeline circuits 80—here two pipeline circuits 80a and 80b. Increasing the number of pipeline circuits 80 typically allows an increase in the number n of hardwired pipelines $74_1$-$74_n$, and thus an increase in the functionality of the pipeline unit 100 as compared to the pipeline unit 78. Furthermore, the pipeline unit 100 includes a firmware memory 52a for the pipeline circuit 80a and a firmware memory 52b for the pipeline circuit 80b. Alternatively, the pipeline circuits 80a and 80b may share a single firmware memory.

In the pipeline unit 100, the services components, i.e., the communication interface 82, the controller 86, the exception manager 88, the configuration manager 90, and the optional industry-standard bus interface 91, are disposed on the pipeline circuit 80a, and the pipelines $74_1$-$74_n$ and the communication shell 84 are disposed on the pipeline circuit 80b. By locating the services components and the pipelines $74_1$-$74_n$ on separate pipeline circuits 80a and 80b, respectively, one can include a higher number n of pipelines and/or more complex pipelines than he/she can where the service components and the pipelines are located on the same pipeline circuit. Alternatively, the portion of the communication shell 84 that interfaces the pipelines $74_1$-$74_n$ to the interface 82 and to the controller 86 may be disposed on the pipeline circuit 80a.

Further details of the structure and operation of the pipeline unit 100 are discussed in previously cited U.S. Publication No. 2004/0136241 entitled PIPELINE ACCELERATOR FOR IMPROVED COMPUTING ARCHITECTURE AND RELATED SYSTEM AND METHOD.

Figure 6:
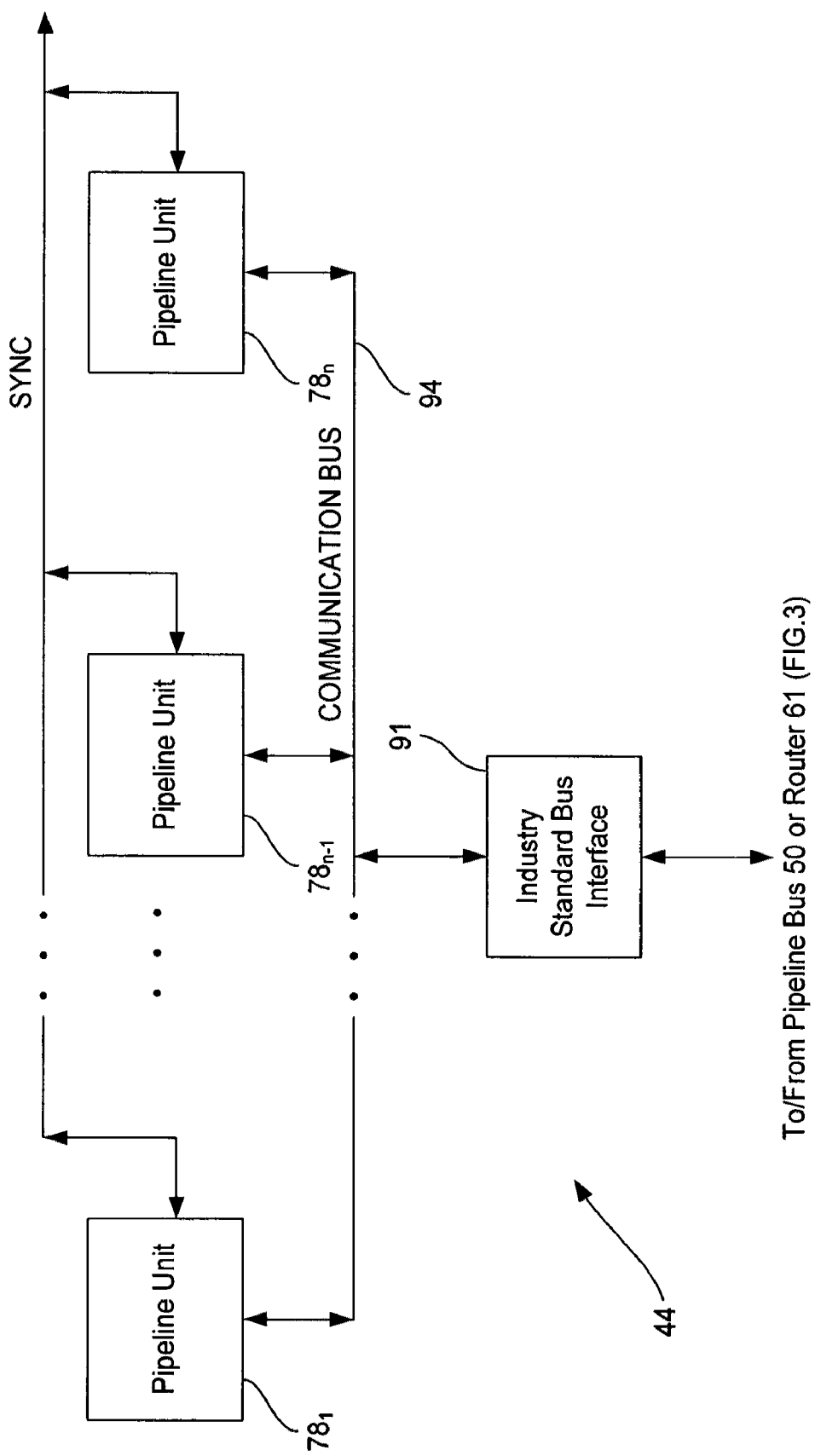
FIG. 6 is a block diagram of the pipeline accelerator of FIG. 3 including multiple pipeline units according to an embodiment of the invention.

FIG. 6 is a block diagram of the accelerator 44 of FIG. 3 having multiple pipeline units 78 (FIG. 4) or 100 (FIG. 5) according to an embodiment of the invention. For clarity, the accelerator 44 is discussed as having multiple pipeline units $78_1$-$78_n$, it being understood that the accelerator may include multiple pipeline units 100 or a combination of units 78 and 100. By including multiple pipeline units 78, one can increase the functionality and processing power of the accelerator 44 as compared to an accelerator having only one pipeline unit. Furthermore, because each pipeline unit 78 typically has a common industry-standard interface, one can easily modify the accelerator 44 by adding or removing pipeline units.

In one implementation of the multiple-pipeline accelerator 44, the industry-standard bus interface 91 is omitted from each pipeline unit $78_1$-$78_n$, and a single external (to the pipeline units) interface 91 and communication bus 94 are common to all of the pipeline units. Including a single external bus interface 91 frees up resources on the pipeline circuits 80 (FIG. 4) as discussed above in conjunction with FIG. 4. The pipeline units $78_1$-$78_n$ may all be disposed on a single circuit board (not shown in FIG. 6), each pipeline unit may be disposed on a respective circuit board, or groups of multiple pipeline units may be respectively disposed on multiple circuit boards. In the latter two implementations, the bus interface 91 is disposed on one of the circuit boards. Alternatively, the pipeline units $78_1$-$78_n$ may each include a respective industry-standard bus interface 91 as discussed above in conjunction with FIG. 4, and thus may each communicate directly with the pipeline bus 50 or router 61 (FIG. 3). In this implementation, the pipeline units $78_1$-$78_n$ may be disposed on a single or multiple circuit boards as discussed above.

Each of the pipeline units $78_1$-$78_n$ is a peer of the host processor 42 (FIG. 3) and of each other. That is, each pipeline unit 78 can communicate directly with any other pipeline unit via the communication bus 94, and can communicate with the host processor 42 via the communication bus 94, the bus interface 91, the router 61 (if present), and the pipeline bus 50. Alternatively, where the pipeline units $78_1$-$78_n$ each include a respective bus interface 91, then each pipeline unit can communicate directly with the host processor 42 via the router 61 (if present) and the pipeline bus 50.

The operation of the multi-pipeline-unit accelerator 44 is now described by way of two examples.

In a first example, the pipeline unit $78_1$ transfers data to the pipeline $78_n$, which processes the data in a time-critical manner; thus, the pipeline units $78_1$ and $78_n$ use one or more SYNC signals to synchronize the data transfer and processing. Typically, a SYNC signal is fast enough to trigger a time-critical function, but requires significant hardware resources; comparatively, an event typically is not fast enough to trigger a time-critical function, but requires significantly fewer hardware resources. As discussed in previously cited U.S. Publication No. 2004/0136241 entitled PIPELINE ACCELERATOR FOR IMPROVED COMPUTING ARCHITECTURE AND RELATED SYSTEM AND METHOD, because a SYNC signal is routed directly from peer to peer, it can trigger a function more quickly than an event, which traverses, e.g., the pipeline bus 50 (FIG. 3), and the communication bus 94. But because they are separately routed, the SYNC signals require dedicated circuitry, such as routing lines and buffers of the pipeline circuit 80 (FIG. 4). Conversely, because they use the existing data-transfer infrastructure (e.g. the pipeline bus 50 and the communication bus 94), the events require fewer dedicated hardware resources. Consequently, designers tend to use events to trigger all but the most time-critical functions.

First, the pipeline unit $78_1$ sends data to the pipeline unit $78_n$ by driving the data onto the communication bus 94. Typically, the pipeline unit $78_1$ generates a message that includes the data and a header that contains the address of the pipeline unit $78_n$. If the pipeline unit $78_1$ were to send the data to multiple pipeline units 78, then it may do so in one of two ways. Specifically, the pipeline unit $78_1$ may sequentially send separate messages to each of the destination pipeline units 78, each message including a header containing the address of a respective destination unit. Alternatively, the pipeline unit $78_1$ may simultaneously send the data to each of the destination pipeline units 78 by including in single message the data and a header containing the addresses of each destination pipeline unit. The sending of data is further discussed in previously cited U.S. Publication No. 2004/0136241 entitled PIPELINE ACCELERATOR FOR IMPROVED COMPUTING ARCHITECTURE AND RELATED SYSTEM AND METHOD.

Next, the pipeline unit $78_n$ receives the data. Because the pipeline units $78_1$-$78_n$ are each coupled to the common communication bus 94, each pipeline unit $78_2$-$78_n$ determines whether or not it is an intended recipient of the data. For example, each pipeline unit $78_2$-$78_n$ determines whether its address is included in the header of the message. In this example, the units $78_2$-$78_{n-1}$ determine that they are not intended recipients of the data, and thus ignore the data, i.e., do not load the data into their data memories 92 (FIG. 4). Conversely, the pipeline unit $78_n$ determines that it is an intended recipient of the data, and thus loads the data into its data memory 92. The receiving of data is discussed further in U.S. Publication No. 2004/0136241 entitled PIPELINE ACCELERATOR FOR IMPROVED COMPUTING ARCHITECTURE AND RELATED SYSTEM AND METHOD Then, when the pipeline unit $78_n$ is ready to process the received data, a peer, such as the pipeline unit $78_1$, or an external device (not shown) pulses a SYNC signal to cause the pipeline unit $78_n$ to process the data in a timely manner. There exist a number of techniques by which the peer/device that pulses the SYNC signal may determine when the pipeline unit $78_n$ is ready to process the received data. For example, the peer/device may merely pulse the SYNC signal a predetermined time after the pipeline unit $78_1$ sends the data. Presumably, the predetermined time is long enough to allow the pipeline unit $78_n$ to receive and load the data into its data memory 92 (FIG. 4). Alternatively, the pipeline unit $78_n$ may pulse a SYNC signal to inform the peer/device that it is ready to process the received data.

Next, in response to the pulsed SYNC signal, the pipeline unit $78_n$ processes the received data. The processing of data by a pipeline unit is discussed further in previously cited U.S. Publication No. 2004/0136241 entitled PIPELINE ACCELERATOR FOR IMPROVED COMPUTING ARCHITECTURE AND RELATED SYSTEM AND METHOD.

Then, when the pipeline unit $78_n$ is finished processing the data, a peer, an external device (not shown), or the unit $78_n$ itself may pulse a SYNC signal to notify the pipeline unit $78_1$ to send more data.

In a second example, the host processor 42 (FIG. 3) transfers data to the pipeline $78_n$, which processes the data in a non-time-critical manner; thus the host processor and the pipeline unit $78_n$ use one or more events to synchronize the data transfer and processing for the reasons discussed above.

First, the host processor 42 (FIG. 3) sends data to the pipeline unit $78_n$ by driving the data onto the pipeline bus 50 (FIG. 3). Typically, the host processor 42 generates a message that includes the data and a header containing the address of the pipeline unit $78_n$. If the host processor 42 were to send the data to multiple pipeline units 78, then it may do so in one of the two ways discussed above in conjunction with the first example.

Next, the pipeline unit 78, receives the data from the pipeline bus 50 (FIG. 3) via the industry-standard bus interface 91 and the communication bus 94. Because the pipeline units $78_1$-$78_n$ are each coupled to the common communication bus 94, each pipeline unit determines whether it is an intended recipient of the data in the manner discussed above in conjunction with the first example.

Then, when the pipeline unit 78, is ready to process the received data, a peer, such as the host processor 42 (FIG. 3), or an external device (not shown), generates an event on the pipeline bus 50 or directly on the communication bus 94 to cause the pipeline unit $78_n$ to process the data in a timely manner. There exist a number of techniques by which the peer/device that generates the event may determine when the pipeline unit $78_n$ is ready to process the received data. For example, the peer/device may merely generate the event a predetermined time after the host processor 42 sends the data. Presumably, the predetermined time is long enough to allow the pipeline unit $78_n$ to receive and load the data into its data memory 92 (FIG. 4). Alternatively, the pipeline unit $78_n$ may generate an event to inform the peer/device that it is ready to process the received data.

Next, the pipeline unit $78_n$ receives the event. The receiving of an event is discussed in previously cited U.S. Publication No. 2004/0136241 entitled PIPELINE ACCELERATOR FOR IMPROVED COMPUTING ARCHITECTURE AND RELATED SYSTEM AND METHOD.

Then, in response to the received event, the pipeline unit $78_n$ processes the received data. The processing of data by a pipeline unit $78_n$ is discussed further in previously cited U.S. Publication No. 2004/0136241 entitled PIPELINE ACCELERATOR FOR IMPROVED COMPUTING ARCHITECTURE AND RELATED SYSTEM AND METHOD.

Next, when the pipeline unit $78_n$ is finished processing the data, a peer, an external device (not shown), or the unit $78_n$ itself may generate an event to notify the host processor 42 (FIG. 3) to send more data.

Still referring to FIG. 6, alternative implementations of the accelerator 44 are contemplated. For example, although the above-discussed first and second examples of operation respectively use SYNC signals and events exclusively, it is contemplated that the accelerator 44 can use both SYNC signals and events in combination. Furthermore, other peers can use one or more of the multiple pipeline units 78 or 100 merely for bulk storage of data in their respective data memories 92. In addition, a designer may replace the host processor 42 (FIG. 3) with one or more of the pipeline units 78 or 100, which together form a "host" peer that performs the functions of the host processor. Moreover, one or more of the pipeline units 78 or 100 may act as one or more message-distribution peers. For example, suppose that the host processor 42 generates a message for transmission to multiple subscriber peers. The host processor 42 may send the message to a message-distribution peer, which then distributes the message to each of the subscriber peers. Consequently, the message-distribution peer, not the host processor 42, undertakes the burden of distributing the message, and thus allows the host processor to devote more time and resources to other tasks.

Figure 7:
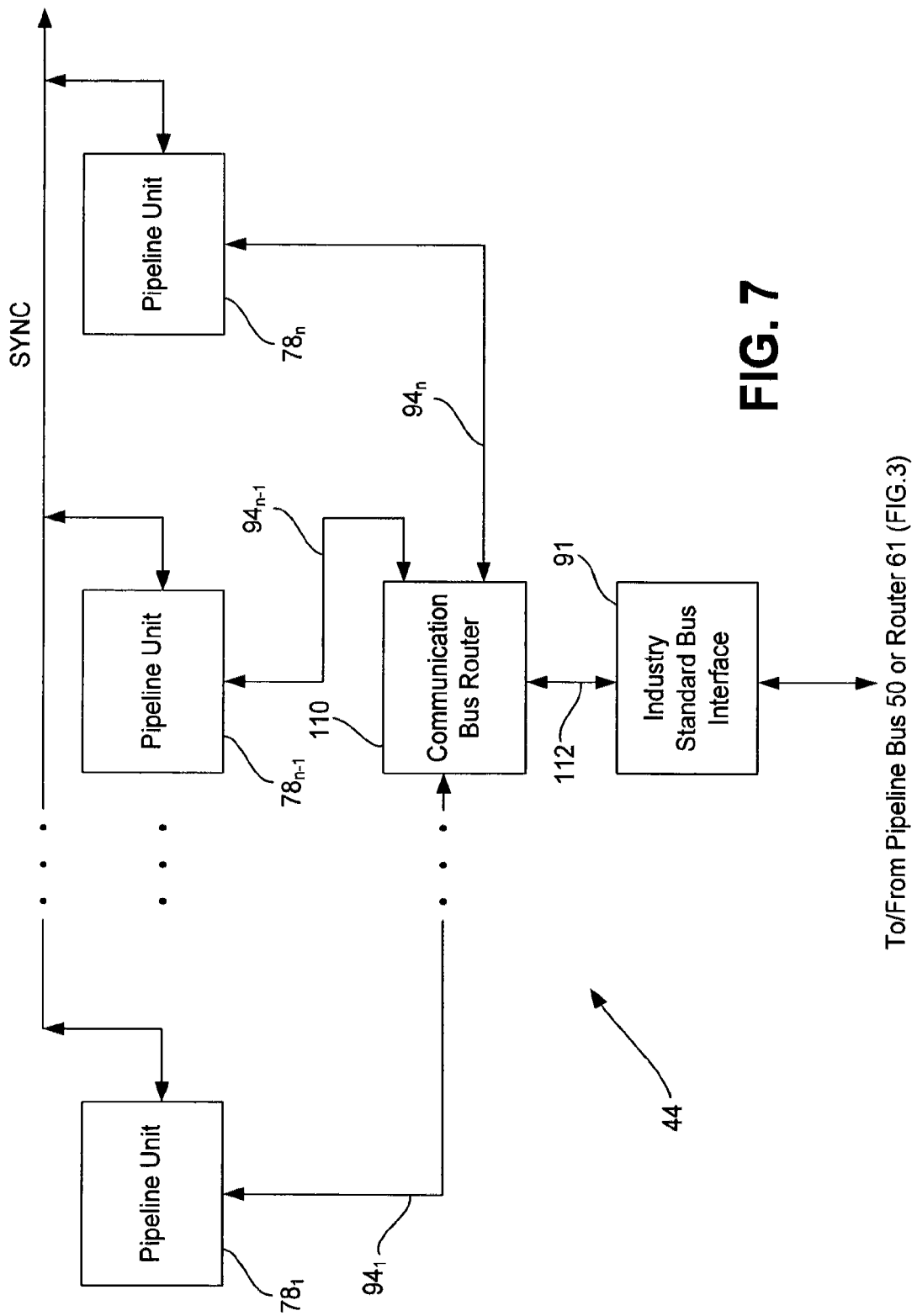
FIG. 7 is a block diagram of the pipeline accelerator of FIG. 3 including multiple pipeline units according to another embodiment of the invention.

FIG. 7 is a block diagram of the accelerator 44 (FIG. 3) having multiple pipeline units 78 (FIG. 4) or 100 (FIG. 5) according to another embodiment of the invention.

The accelerator 44 of FIG. 7 is the same as the accelerator 44 of FIG. 6, except that the accelerator 44 of FIG. 7 includes a communication-bus router 110 for routing data between the pipeline units $78_1$-$78_n$ and other peers, such as the host processor 42 (FIG. 3), and devices (not shown) that are coupled to the pipeline bus 50 (FIG. 3). For clarity, the accelerator 44 of FIG. 7 is discussed as having multiple pipeline units $78_1$-$78_n$, it being understood that the accelerator may include multiple pipeline units 100 or a combination of units 78 and 100.

The communication-bus router 110 is coupled to the pipeline units $78_1$-$78_n$ via respective branches $94_1$-$94_n$ of the communication bus 94, and is coupled to the industry-standard bus interface 91 (if present) via a bus 112. Alternatively, as discussed above in conjunction with FIG. 6, each pipeline unit $78_1$-$78_n$ may include a respective interface 91 on board, and thus the external interface 91 can be omitted such that the router 110 is directly coupled to the pipeline bus 50 (or router 61 if present) of FIG. 3.

The router 110 routes signals from the pipeline bus 50 (FIG. 3) to the respective destination pipeline unit or units $78_1$-$78_n$, and also routes signals from a source pipeline unit to one or more destination pipeline units or to the pipeline bus. Consequently, the router 110 offloads from each of the pipeline units $78_1$-$78_n$ the function of determining whether a signal on the communication bus 94 is intended for that pipeline unit. This offloading may free up resources on the pipeline circuit 80 (FIG. 4) of each pipeline unit $78_1$-$78_n$, and thus may allow an increase in the functionality of each pipeline unit.

Still referring to FIG. 7, the operation of the multi-pipeline-unit accelerator 44 with the router 110 is now described. Because the operation is similar to that described above for the accelerator 44 of FIG. 6, the below description highlights the operational differences between the accelerators of FIGS. 6 and 7.

In a first example, the pipeline unit $78_1$ transfers data to the pipeline $78_n$, which processes the data in a time-critical manner; thus, the pipeline units $78_1$ and $78_n$ use one or more SYNC signals to synchronize the data transfer and processing as discussed above in conjunction with the first example of FIG. 6.

First, the pipeline unit $78_1$ sends data to the pipeline unit $78_n$ by driving the data onto the branch $94_1$ of the communication bus. Typically, the pipeline unit $78_1$ generates a message that includes the data and a header that contains the address of the pipeline unit $78_n$.

Next, the router 110 receives the data, determines that the destination of the data is the pipeline unit $78_n$, and drives the data onto the branch $94_n$ of the communication bus. Typically, the router 110 determines the destination of the data by analyzing the header of the message containing the data and extracting the destination address from the header. Consequently, because the router 110 determines the proper destination of the data, the pipeline unit $78_n$ can merely accept the data from the router without determining whether it is an intended recipient of the data. Alternatively, the pipeline $78_n$ may determine whether it is an intended recipient of the data, and generate an exception (discussed in previously cited U.S. Publication Nos. 2004/0133763 entitled IMPROVED COMPUTING ARCHITECTURE AND RELATED SYSTEM AND METHOD, 2004/0181621 entitled COMPUTING MACHINE HAVING IMPROVED COMPUTING ARCHITECTURE AND RELATED SYSTEM AND METHOD, and 2004/0136241 entitled PIPELINE ACCELERATOR FOR IMPROVED COMPUTING ARCHITECTURE AND RELATED SYSTEM AND METHOD if it is not an intended recipient. The pipeline unit $78_n$ can send this exception to the host processor 42 (FIG. 3) via the router 110, the industry-standard bus interface 91 (if present), the router 61 (if present), and the pipeline bus 50 (FIG. 3).

Then, the pipeline unit $78_n$ loads the data from the bus branch $94_n$. The loading of data by a pipeline unit is further discussed in previously cited U.S. Publication No. 2004/0136241 entitled PIPELINE ACCELERATOR FOR IMPROVED COMPUTING ARCHITECTURE AND RELATED SYSTEM AND METHOD.

Next, when the pipeline unit $78_n$ is ready to process the received data, a peer, such as the pipeline unit $78_1$, or an external device (not shown) pulses a SYNC signal to cause the pipeline unit $78_n$ to process the data in a timely manner as discussed above in conjunction with the first example of FIG. 6.

Then, in response to the pulsed SYNC signal, the pipeline unit $78_n$ processes the received data as discussed above in conjunction with the first example of FIG. 6.

Next, when the pipeline unit $78_n$ is finished processing the data a peer, an external device (not shown), or the unit $78_n$ itself may pulse a SYNC signal to notify the pipeline unit $78_1$ to send more data.

In a second example, the host processor 42 (FIG. 3) transfers data to the pipeline $78_n$, which processes the data in a non-time-critical manner; thus the host processor and the pipeline unit $78_n$ use one or more events to synchronize the data transfer and processing for the reasons discussed above in conjunction with FIG. 6.

First, the host processor 42 (FIG. 3) sends data to the pipeline unit $78_n$ by driving the data onto the pipeline bus 50 (FIG. 3). Typically, the host processor 42 generates a message that includes the data and a header containing the address of the pipeline unit $78_n$.

Next, the router 110 receives the data from the pipeline bus 50 (FIG. 3) via the industry-standard bus interface 91 (if present) and the bus 112.

Then, the router 110 determines that the destination of the data is the pipeline unit $78_n$, and drives the data onto the branch $94_n$ of the communication bus. Typically, the router 110 determines the destination of the header as discussed above in conjunction with the first example of FIG. 7. Consequently, because the router 110 determines the proper destination of the data, the pipeline unit $78_n$ can merely accept the data from the router without determining whether it is an intended recipient of the data. Alternatively, the pipeline $78_n$ may determine whether it is an intended recipient of the data, generate an exception (discussed in previously cited U.S. Publication Nos. 2004/0133763 entitled IMPROVED COMPUTING ARCHITECTURE AND RELATED SYSTEM AND METHOD, 2004/0181621 entitled COMPUTING MACHINE HAVING IMPROVED COMPUTING ARCHITECTURE AND RELATED SYSTEM AND METHOD, and 2004/0136241 entitled PIPELINE ACCELERATOR FOR IMPROVED COMPUTING ARCHITECTURE AND RELATED SYSTEM AND METHOD if it is not an intended recipient, and send the exception to the host processor 42 (FIG. 3) as discussed above in conjunction with the second example of FIG. 6.

Next, the pipeline unit $78_n$ loads the data from the bus branch $94_n$. The loading of data by a pipeline unit is further discussed in previously cited U.S. Publication No. 2004/0136241 entitled PIPELINE ACCELERATOR FOR IMPROVED COMPUTING ARCHITECTURE AND RELATED SYSTEM AND METHOD.

Then, when the pipeline unit $78_n$ is ready to process the received data, a peer, such as the host processor 42 (FIG. 3), or an external device (not shown), generates an event on the pipeline bus 50 or on one of the branches $94_1$-$94_{n-1}$ of the communication bus to cause the unit $78_n$ to process the data in a timely manner as discussed above in conjunction with the second example of FIG. 6.

Next, the router 110 receives the event, determines that it is intended for the pipeline unit $78_n$, and drives the event onto the bus branch $94_n$.

Then, the pipeline unit $78_n$ loads the event from the bus branch 94. The loading of an event by a pipeline unit 78 is discussed in previously cited U.S. Publication No. 2004/0136241 entitled PIPELINE ACCELERATOR FOR IMPROVED COMPUTING ARCHITECTURE AND RELATED SYSTEM AND METHOD.

Next, in response to the received event, the pipeline unit $78_n$ processes the received data.

Then, when the pipeline unit $78_n$ is finished processing the data, a peer, an external device (not shown), or the unit $78_n$ itself may generate an event to notify the host processor 42 (FIG. 3) to send more data.

Still referring to FIG. 7, although the first and second examples of operation respectively use SYNC signals and events exclusively, it is contemplated that the accelerator 44 can use a combination of both SYNC signals and events.

FIG. 8 is a block diagram of the accelerator 44 of FIG. 3 including multiple groups 120 of multiple pipeline units 78 (FIG. 4) or 100 (FIG. 5) according to an embodiment of the invention. Including multiple groups 120 of pipeline units increases the functionality of the accelerator 44, and allows a designer to increase the accelerator's efficiency by grouping pipeline units that perform related operations. For clarity, the accelerator 44 of FIG. 8 is discussed as having multiple pipeline units 78, it being understood that the accelerator may include multiple pipeline units 100 or a combination of units 78 and 100. Furthermore, the pipeline units 78 do not include industry-standard bus interfaces 91 (this interface is external in this embodiment), although they may in another embodiment.

The accelerator 44 includes six groups $120_1$-$120_6$ of pipeline units 78, each group having three pipeline units and a respective intra-group communication-bus router $110_1$-$110_6$ that interconnects the pipeline units to each other and to the other pipeline-unit groups. Although the accelerator 44 is discussed as including six groups $120_1$-$120_6$ of three pipeline units 78 each, other implementations of the accelerator may include virtually any number of groups of any number pipeline units, and not all the groups need have the same number of pipeline units. Furthermore, the communication-bus routers $110_1$-$110_6$ may be omitted as discussed above in conjunction with the accelerator 44 of FIG. 6.

The pipeline-unit group $120_1$ includes three pipeline units $78_1$-$78_3$, which are connected to an intra-group communication-bus router $110_1$ via branches $94_1$, $94_2$, and $94_3$, respectively, of a communication bus in a manner similar to that discussed above in conjunction with FIG. 7. The other groups $120_2$-$120_6$ are similar.

The communication-bus routers $110_1$-$110_3$ of the groups $120_1$-$120_3$ are connected to a first-level router $122_1$ via respective branches $124_1$-$124_3$ of a first-level bus $126_1$. The router $122_1$ and bus $126_1$ allow the pipeline units $78_1$-$78_9$ to communicate with each other.

Similarly, the communication-bus routers $110_4$-$110_6$ are connected to a first-level router $122_2$ via respective branches $128_1$-$128_3$ of a first-level bus $126_2$. The router $122_2$ and bus $126_2$ allow the pipeline units $78_{10}$-$78_{18}$ to communicate with each other.

The first-level routers $122_1$ and $122_2$ are connected to a second-level router 130 via respective branches $132_1$-$132_2$ of a second-level bus 134. The router 130 and bus 134 allow the pipeline units $78_1$-$78_{18}$ to communicate with each other and with other peers/devices as discussed below.

The pipeline bus 50 and a secondary pipeline bus 136 are coupled to the second-level router 130 via the respective industry-standard bus interfaces $91_1$ and $91_2$. The secondary pipeline bus 136 may be connected to peers, such as the host processor 42 (FIG. 3), or peripherals, such as a hard-disk drive (not shown), that are not coupled to the pipeline bus 50. Furthermore, either or both of the busses 50 and 136 may be coupled to peers or peripherals via a network or the internet (neither shown) such that the accelerator 44 can be remotely located from other peers, such as the host processor 42 (FIG. 3).

A bus 138 directly connects one or more SYNC signals to all of the pipeline units $78_1$-$78_{18}$ and to other peers, such as the host processor 42 (FIG. 3), or devices (not shown).

Still referring to FIG. 8, in one example of operation, each group $120_1$-$120_6$ of pipeline units 78 processes data from a respective sensor of a sonar array (not shown) that is coupled to the secondary pipeline bus 136. Because the pipeline units $78_1$-$78_3$ of the group $120_1$ are interconnected by a single router $110_1$, these pipeline units can communicate with each other more quickly than they can with the pipeline units $78_4$-$78_{18}$ of the other groups $120_2$-$120_6$. This higher communication speed is also present in each of the other groups $120_2$-$120_6$. Consequently, a designer can increase the processing speed of the accelerator 44 by grouping together pipeline units that frequently transfer data or otherwise communicate among themselves.

In general, the pipeline units $78_1$-$78_{18}$ communicate with each other and with peers, such as the host processor 42 (FIG. 3), and devices coupled to the buses 50 and 136 in a manner similar to that discussed above in conjunction with FIG. 7. For example, a sensor (not shown) coupled to the bus 136 communicates with the pipeline unit $78_1$ via the industry-standard bus interface $91_1$, the second-level router 130, the first level router $122_1$, and the intra-group router $110_1$. Similarly, the pipeline unit $78_1$ communicates with the pipeline unit 78$_7$ via the routers 110$_1$, 122$_1$, and 110$_3$, and communicates with the pipeline unit 78$_{10}$ via the routers 110$_1$, 122$_1$, 130, 122$_2$, and 110$_4$.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method, comprising:
    sending, via a communication bus, first data and a second data to first and second ones, respectively, of a plurality of pipeline units, each pipeline unit including a respective hardwired pipeline;
    processing the first data with the first pipeline unit synchronized to a first clock signal;
    processing the second data with the second pipeline unit synchronized to a second clock signal and asynchronously relative to the first pipeline unit while the first pipeline unit is processing the first data, the second clock signal being unrelated to the first clock signal;
    generating a message that includes the first data and that identifies the first pipeline unit as a recipient of the message, wherein sending the first data to the first pipeline unit comprises determining from an address in a header of the message that the first pipeline unit is a recipient of the message;
    receiving the first data from the communication bus with a hardwired-pipeline circuit;
    processing the received first data in response to a synchronization signal to cause the first pipeline unit to process the data if the first pipeline unit is the recipient of the message; and loading the processed first data into a memory.

2. The method of claim 1 wherein sending the data comprises:
    sending the data to a router; and
    providing the first data to the first pipeline unit with the router via a respective first branch of the communication bus.

3. The method of claim 1 wherein sending the first data comprises sending the first data to the first pipeline unit with a processor.

4. The method of claim 1 wherein sending the first data comprises sending the first data to the first pipeline unit with a third of the plurality of pipeline units.

5. The method of claim 1, further comprising driving the processed first data onto the communication bus with the first pipeline unit.

6. The method of claim 1 wherein processing the first data with the first pipeline unit comprises:
    receiving the first data from the communication bus with a hardwired-pipeline circuit,
    loading the first data into a memory with the hardwired-pipeline circuit,
    retrieving the first data from the memory with the hardwired-pipeline circuit, and
    processing the retrieved data with the hardwired-pipeline circuit.

7. The method of claim 1, further comprising:
    wherein processing the first data with the first pipeline unit comprises:
        retrieving the processed first data from the memory and driving the processed data onto the communication bus with the hardwired-pipeline circuit.

8. A pipeline accelerator, comprising:
    a communication bus;
    a plurality of clock signal lines operable to carry at least a first clock signal and a second clock signal, the first and second clock signals being unrelated to one another; and
    a plurality of pipeline units each comprising a respective hardwired-pipeline and each coupled to the communication bus,
        wherein first and second pipeline units receive first data and a second data over the communications bus,
        wherein the first pipeline unit is operable to receive a message including the first data and including an address identifying that the first pipeline unit is the recipient of the message,
        wherein the first pipeline unit is operable to process the first data synchronized to the first clock signal,
        wherein the second pipeline unit is operable to process the second data synchronized to a second clock signal and asynchronously relative to the first pipeline unit while the first pipeline unit is processing the first data, the second clock signal being unrelated to the first clock signal,
        wherein the first pipeline unit is operable to process the received first data in response to a synchronization signal to cause the first pipeline unit to process the data when the first pipeline unit is the recipient of the message; and
        wherein the first pipeline unit is operable to load the processed first data into a memory.

9. The pipeline accelerator of claim 8, wherein each of the pipeline units comprises:
    a respective memory coupled to the hardwired-pipeline circuit; and
    wherein the hardwired-pipeline circuit is operable to:
    receive data from the communication bus,
    load the data into the memory,
    retrieve the data from the memory,
    process the retrieved data, and
    drive the processed data onto the communication bus.

10. The pipeline accelerator of claim 8, wherein each of the pipeline units comprises:
    a respective memory coupled to the hardwired-pipeline circuit; and
    wherein the hardwired-pipeline circuit is operable to:
        receive data from the communication bus,
        process the data,
        load the processed data into the memory,
        retrieve the processed data from the memory, and
        load the retrieved data onto the communication bus.

11. The pipeline accelerator of claim 8, further comprising:
    a pipeline bus; and
    a pipeline-bus interface coupled to the communication bus and to the pipeline bus.

12. The pipeline accelerator of claim 8 wherein the communication bus comprises a plurality of branches, a respective branch coupled to each pipeline unit and further comprising a router coupled to each of the branches.

13. The pipeline accelerator of claim 12, further comprising:
    a pipeline bus; and
    a pipeline-bus interface coupled to the router and to the pipeline bus.

14. The pipeline accelerator of claim 13 further comprising a secondary bus coupled to the router.

* * * * *